US011193596B2

(12) United States Patent
Tang

(10) Patent No.: US 11,193,596 B2
(45) Date of Patent: Dec. 7, 2021

(54) ELECTRIC VALVE AND MANUFACTURING METHOD THEREFOR

(71) Applicant: Zhejiang Sanhua Climate and Appliance Controls Group Co., Ltd., Zhejiang (CN)

(72) Inventor: Sijie Tang, Zhejiang (CN)

(73) Assignee: Zhejiang Sanhua Climate and Appliance Controls Group Co., Ltd, Shaoxing (CN)

( * ) Notice: Subject to any disclaimer, the term of this patent is extended or adjusted under 35 U.S.C. 154(b) by 0 days.

(21) Appl. No.: 16/967,707

(22) PCT Filed: May 8, 2018

(86) PCT No.: PCT/CN2018/085982
§ 371 (c)(1),
(2) Date: Aug. 5, 2020

(87) PCT Pub. No.: WO2019/157782
PCT Pub. Date: Aug. 22, 2019

(65) Prior Publication Data
US 2021/0041028 A1    Feb. 11, 2021

(30) Foreign Application Priority Data

Feb. 13, 2018 (CN) .......................... 201810147921.9
Feb. 13, 2018 (CN) .......................... 201810148020.1

(51) Int. Cl.
*F16K 1/54* (2006.01)
*F16K 31/06* (2006.01)

(52) U.S. Cl.
CPC ............ *F16K 1/54* (2013.01); *F16K 31/0655* (2013.01)

(58) Field of Classification Search
CPC ................................ F16K 1/54; F16K 31/0655
See application file for complete search history.

(56) References Cited

U.S. PATENT DOCUMENTS 9,435,451 B2 *  9/2016  Shen .................... F25B 41/31
2010/0181514 A1  7/2010  Ohuchi

FOREIGN PATENT DOCUMENTS

CN      105090534 A     11/2015
CN      206159607 U      5/2017
(Continued)

OTHER PUBLICATIONS

International Search Report and Written Opinion for International Application No. PCT/CN2018/085982, dated Nov. 8, 2018.
(Continued)

*Primary Examiner* — Eric Keasel
(74) *Attorney, Agent, or Firm* — Wolf, Greenfield & Sacks, P.C.

(57) ABSTRACT

An electric valve includes a valve body component, a transmission component, and a valve needle component. The valve body component includes a valve core sleeve, and the valve core sleeve includes a first inner guide wall. A movable connecting component is in a suspended connection with the transmission component, the movable connecting component includes a connecting body, the connecting body includes a first outer guide wall, the connecting body includes a lower opening portion and an accommodating hole in communication with the lower opening portion, and a hole wall of the accommodating hole includes a second inner guide wall. The valve needle component includes a valve needle, the valve needle includes a second outer guide wall, the second outer guide wall is slidably in clearance fit with the second inner guide wall. A manufacturing method for the electric valve is further disclosed.

14 Claims, 11 Drawing Sheets

(56) References Cited

FOREIGN PATENT DOCUMENTS

| | | |
|---|---|---|
| CN | 206647571 U | 11/2017 |
| JP | H09-068287 A | 3/1997 |
| JP | 2003-329158 A | 11/2003 |
| JP | 2008-175240 A | 7/2008 |
| JP | 2012-172839 A | 9/2012 |
| WO | 2006/064865 A1 | 6/2006 |

OTHER PUBLICATIONS

Extended European Search Report for European Application No. 18906699.6, dated Oct. 8, 2021.

* cited by examiner

ELECTRIC VALVE AND MANUFACTURING METHOD THEREFOR

This application is a national stage filing under 35 U.S.C. § 371 of International Patent Application Serial No. PCT/CN2018/085982, filed May 8, 2018, which claims priority to Chinese Patent Application No. 201810147921.9, titled "ELECTRIC VALVE AND MANUFACTURING METHOD THEREFOR", filed with the China National Intellectual Property Administration on Feb. 13, 2018, and Chinese Patent Application No. 201810148020.1, titled "ELECTRIC VALVE AND MANUFACTURING METHOD THEREFOR", filed with the China National Intellectual Property Administration on Feb. 13, 2018. The contents of these applications are incorporated herein by reference in their entireties.

FIELD

The present application relates to the technical field of fluid control, and in particular to an electric valve and a manufacturing method therefor.

BACKGROUND

An electric valve as an important component for constituting a refrigeration system is widely used in the refrigeration unit, the cold store, the supermarket freezer and so on.

An electric valve generally includes a valve body component, a drive component, a transmission component, a sleeve component with a valve port, and a valve needle component. Driven by the rotation of the drive component, the transmission component acts on the valve needle component to allow the valve needle component to move away from or come into contact with a valve port portion, thereby achieving the flow regulation function of the electric valve. In an electric valve according to the background technology, an elastic force load of a spring always acts between a transmission shaft of the transmission component and a valve needle of the valve needle component, resulting in that the valve needle rotates with the rotation of the transmission shaft during the whole operation of the valve as long as no resistance force (the force for stopping rotation) for overcoming the friction resistance caused by the spring load acts on the valve needle in the rotation direction of the valve needle and the transmission shaft. On the one hand, the valve opening resistance is large, which adversely affects the operation reliability of the electric valve. On the other hand, the abrasion of the contact surface between the valve needle and the valve port portion may aggravate, resulting in poor sealing performance of the valve. The operation reliability of the electric valve is an important index to measure the performance of the product.

SUMMARY

An object of the present application is to provide an electric valve, which relatively improves the valve opening reliability and improves the operation reliability of the valve needle component.

The electric valve provided according to the present application includes:
- a valve body component including a valve core sleeve, wherein the valve core sleeve includes a first guide inner wall;
- a drive component including an electromagnetic coil and a rotor;
- a transmission component including a transmission shaft, wherein the transmission shaft is fixedly connected with the drive component;
- a movable connecting component suspendingly connected with the transmission component, wherein the movable connecting component is configured to be driven by the transmission component to axially move with respect to the valve core sleeve; the movable connecting component includes a connecting body, the connecting body includes a first guide outer wall, the first guide outer wall is in sliding clearance fit with the first guide inner wall, the connecting body includes a lower opening portion, an accommodating hole in communication with the lower opening portion, and a hole wall of the accommodating hole includes a second guide inner wall;
- a valve needle component suspendingly connected with the movable connecting component, wherein the valve needle component is configured to be driven by the movable connecting component to move in the axial direction of the valve core sleeve; the valve needle component includes a valve needle, the valve needle includes a second guide outer wall, and the second guide outer wall is in sliding clearance fit with the second guide inner wall; and
- an elastic member, wherein one end of the elastic member abuts against the movable connecting component, and another end of the elastic member abuts against the valve needle.

In the electric valve, the valve core sleeve guides the movable connecting component by the arrangement of the first guide inner wall and the first guide outer wall, and the movable connecting component guides the valve needle component by the arrangement of the second guide inner wall and the second guide outer wall. In this way, the valve needle component is indirectly guided by the valve core sleeve, so that the valve needle component is more accurately aligned with the valve port, the valve closing tightness is improved, and the valve needle component operates stably. One end of the elastic member abuts against the movable connecting component, and another end of the elastic member abuts against the valve needle component. In this way, at the very moment when the electric valve is opened, the elastic force of the elastic member generates an upward thrust effect on the movable connecting component, the valve opening reliability is improved, and the operation reliability of the valve needle component is improved.

A method for manufacturing the electric valve with the above functions is further provided according to the present application, which includes the following steps:

A1, preparing an upper valve body, a lower valve body, and a valve core sleeve of the valve body component, preparing the rotor, preparing a connecting body, an upper member and a lower member of the movable connecting component, preparing a valve needle and a lower clamping member of the valve needle component, preparing the transmission component and preparing a nut component;

A2, arranging the elastic member, the lower member and the lower clamping member at a periphery portion of the valve needle, allowing one end of the elastic member to abut against the lower member and another end to abut against the valve needle; arranging the upper member at a periphery portion of the transmission shaft; sleeving the connecting body on the periphery portion of the valve needle, allowing the connecting body to be in sliding clearance fit with the valve needle through the second guide inner wall and the second guide outer wall, and fixedly connecting the upper member and the lower member with an upper opening portion and a lower opening portion of the connecting body respectively;

A3, fixedly connecting the lower valve body with the valve core sleeve;

A4, allowing the valve core sleeve to be in sliding clearance fit with the connecting body through the first guide inner wall and the first guide outer wall;

A5, threadedly connecting the nut component with the transmission shaft, fixedly connecting the nut component with the lower valve body, and fixedly connecting the rotor with the transmission shaft; and A6, fixing the upper valve body of the valve body component to the lower valve body by welding.

An object of the present application is to provide an electric valve, which relatively improves the valve opening reliability and improves the operation reliability of the valve needle component.

Another electric valve provided according to the present application includes:
- a valve body component including a valve core sleeve, wherein the valve core sleeve includes a first guide inner wall;
- a drive component including an electromagnetic coil and a rotor;
- a transmission component including a transmission shaft, wherein the transmission shaft is fixedly connected with the drive component;
- a movable connecting component suspendingly connected with the transmission component, wherein the movable connecting component is configured to be driven by the transmission component to axially move with respect to the valve core sleeve; the movable connecting component includes a connecting body and a lower member fixedly connected with the connecting body, the connecting body includes a first guide outer wall, the first guide outer wall is in sliding clearance fit with the first guide inner wall, and the lower member includes a second guide outer wall;
- a valve needle component suspendingly connected with the movable connecting component, wherein the valve needle component is configured to be driven by the movable connecting component to move in the axial direction of the valve core sleeve, the valve needle component includes a valve needle and a lower clamping member, the valve needle is fixedly connected with the lower clamping member, the lower clamping member includes a second guide inner wall, and the second guide inner wall is in sliding clearance fit with the second guide outer wall; and
- an elastic member, wherein one end of the elastic member abuts against the connecting body, and another end of the elastic member abuts against the valve needle.

In the electric valve, the valve core sleeve guides the movable connecting component by the arrangement of the first guide inner wall and the first guide outer wall, and the movable connecting component guides the valve needle component by the arrangement of the second guide inner wall and the second guide outer wall. In this way, the valve needle component is indirectly guided by the valve core sleeve, so that the valve needle component is more accurately aligned with the valve port, the valve closing tightness is improved, and the valve needle component operates stably. One end of the elastic member abuts against the movable connecting component, and another end of the elastic member abuts against the valve needle component. In this way, at the very moment when the electric valve is opened, the elastic force of the elastic member generates an upward thrust effect on the movable connecting component, so the valve opening is reliable.

Another method for manufacturing the electric valve with the above functions is further provided according to the present application, which includes the following steps:

A1, preparing an upper valve body, a lower valve body, and a valve core sleeve of the valve body component, preparing the rotor, preparing a connecting body, an upper member and a lower member of the movable connecting component, preparing a valve needle and a lower clamping member of the valve needle component, preparing the transmission component and preparing a nut component;

A2, sleeving the lower clamping member at a periphery of the lower member, allowing the lower clamping member to be in sliding clearance fit with the lower member through the second guide inner wall and the second guide outer wall, fixedly connecting the lower clamping member with the valve needle, arranging the elastic member at a periphery of the lower clamping member, extending an upper end of the lower member into a lower inserting hole of the connecting body and fixedly connecting the lower member with the connecting body, arranging the upper member at a periphery of the transmission shaft, and fixedly connecting the upper member with an upper opening portion of the connecting body;

A3, fixedly connecting the lower valve body with the valve core sleeve;

A4, allowing the valve core sleeve to be in sliding clearance fit with the connecting body through the first guide inner wall and the first guide outer wall;

A5, threadedly connecting the nut component with the transmission shaft, fixedly connecting the nut component with the lower valve body, and fixedly connecting the rotor with the transmission shaft; and A6, fixing the upper valve body of the valve body component to the lower valve body by welding.

BRIEF DESCRIPTION OF THE DRAWINGS

In order to illustrate technical solutions in the embodiments of the present application or in the conventional technology more clearly, drawings used in the description of the embodiments or the conventional technology are introduced briefly hereinafter. Apparently, the drawings described hereinafter merely illustrate some embodiments of the present application, and other drawings may be obtained by those skilled in the art based on these drawings without any creative efforts.

DETAILED DESCRIPTION OF THE EMBODIMENTS

Figure 1:
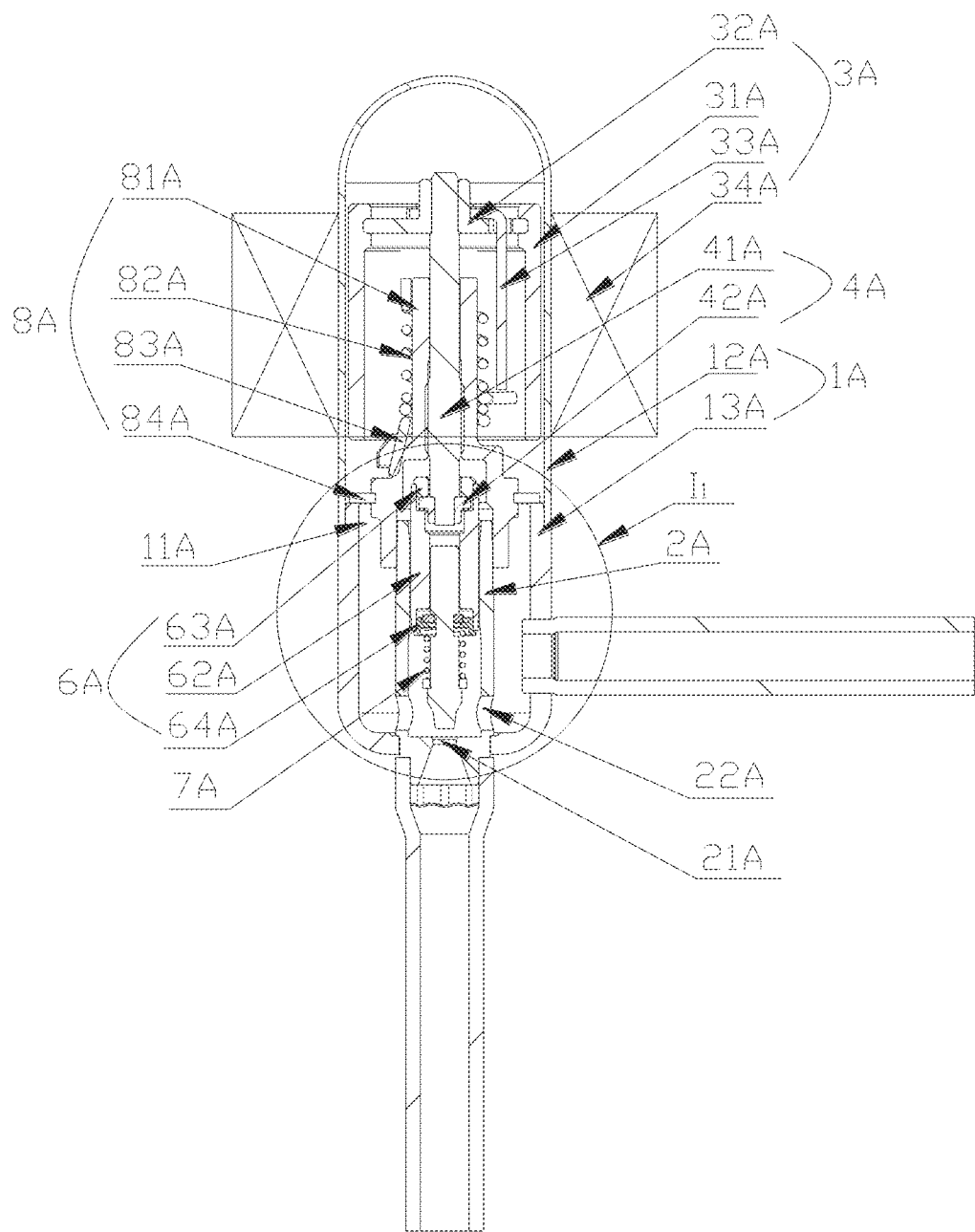
FIG. 1 is a schematic sectional view showing an electric valve according to a first embodiment of the present application, in which the valve is in a fully valve opened state.

In order to provide those skilled in the art with a better understanding of the solutions of the present application, the present application will be described hereinafter in further detail in conjunction with the drawings and specific embodiments.

It should be noted that, the orientation terms such as "upper" and "lower" in the application are defined with reference to positions illustrated in the drawings of the specification, and "axial direction" in the application refers to an axial direction of the electric valve, for example, an axial direction of a valve core sleeve of the electric valve. The term "radial direction" in the application refers to a direction perpendicular to the aforementioned axial direction of the electric valve. It is conceivable that the orientation terms herein are only used for clear and convenient description of the technical solution and should not be deemed as limit to the protection scope.

It should be further noted that, "suspendingly connect" in the application means that one of two components supports the other but the two components are not fixedly connected with each other. When the electric valve is in some states, the two components may move together as an integral body, while when the electric valve is in some other states, there may be axial and/or radial displacement between the two components.

Figure 3:
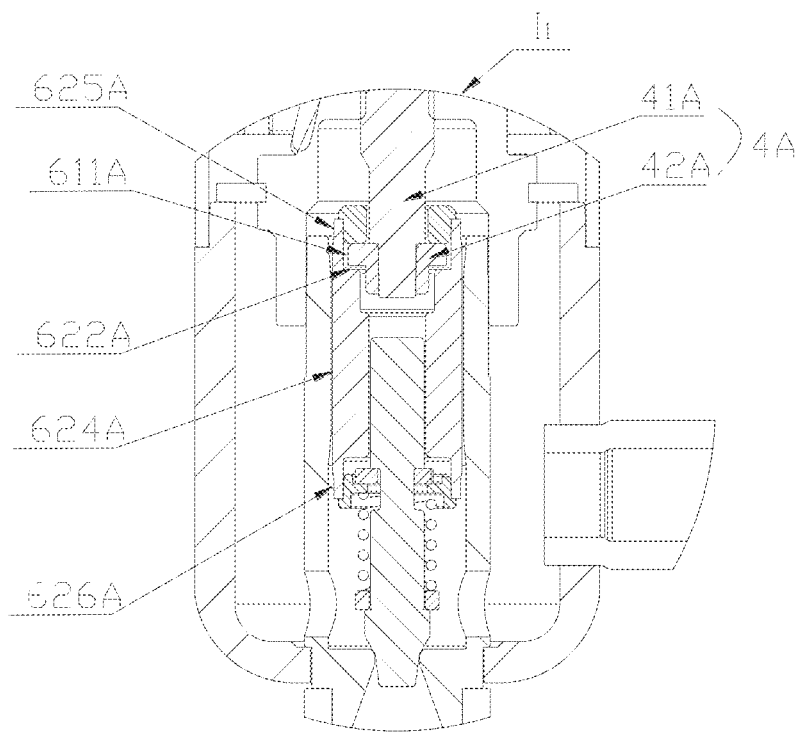
FIG. 3 is a partially enlarged view of the portion I1 in a case that the electric valve in FIG. 1 is in a first valve closed state.
Figure 8:
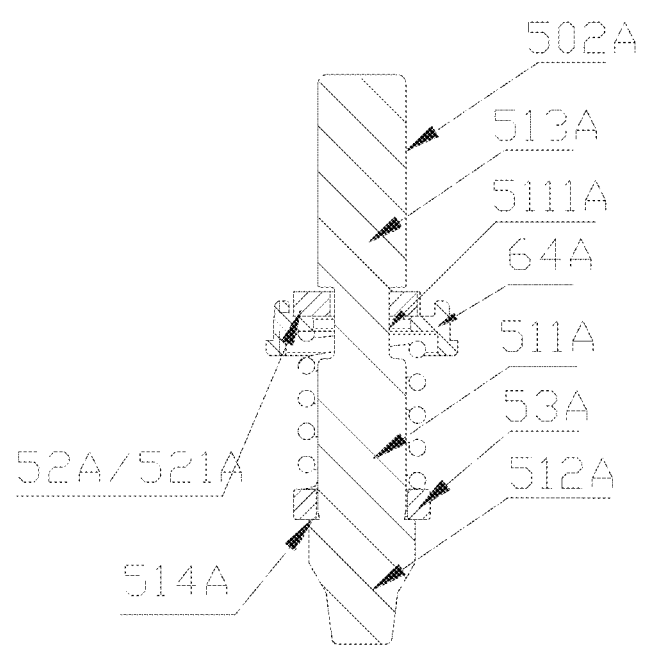
FIG. 8 is a schematic structural view showing an assembly of a valve needle component, a lower member, an elastic member and a gasket of the electric valve according to the first embodiment of the present application.

It should be further noted that, "closed" in the application means that the electric valve is in a first valve closed state shown in FIG. 3, or FIG. 8, that is, the state that the valve needle component just closes the valve port after the valve needle component moves in a valve closing direction from a valve opened state.

Figure 11:
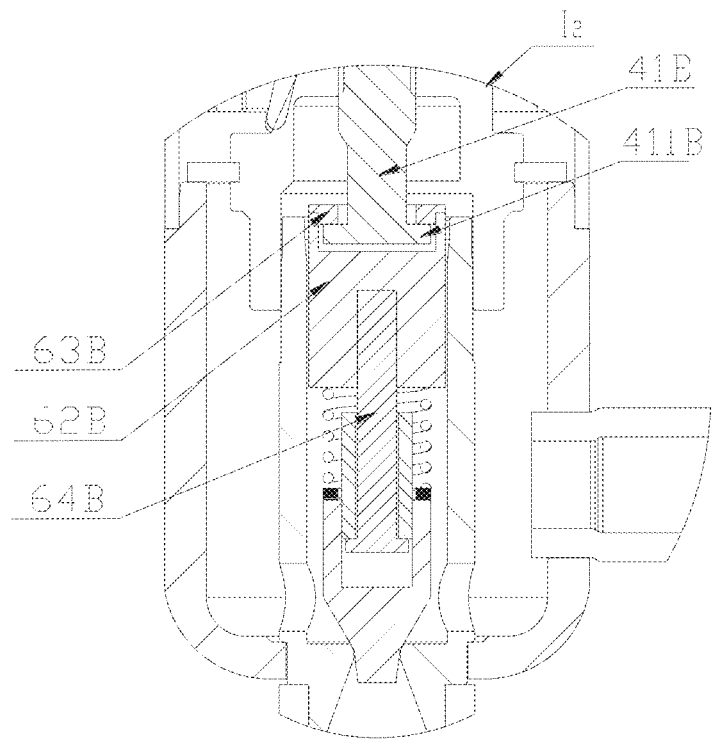
FIG. 11 is a partially enlarged view of the portion I2 in a case that the electric valve in FIG. 9 is in the first valve closed state.

It should be further noted that, the comparison between an axial displacement amount of a transmission component and a predetermined displacement amount described herein is based on the first valve closed state shown in FIG. 3, or FIG. 11, that is, the state that the electric valve is just closed.

It should be further noted that, for ease of description, the first group of guide mechanisms referred to herein includes a first guide inner wall and a first guide outer wall, and the second group of guide mechanisms includes a second guide inner wall and a second guide outer wall.

For those skilled in the art to better understand the technical solution of the present application, the technical solution of the present application, especially key features of the present application, will be described further in detail hereinafter in conjunction with the drawings and embodiments.

First Embodiment

Figure 2:
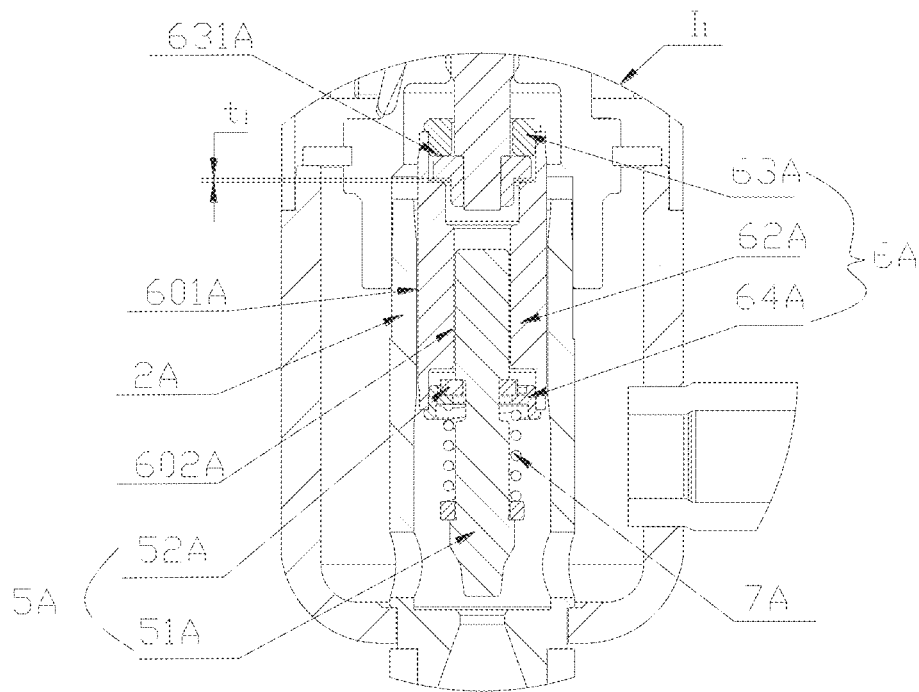
FIG. 2 is a partially enlarged view of a portion I1 in FIG. 1.
Figure 4:
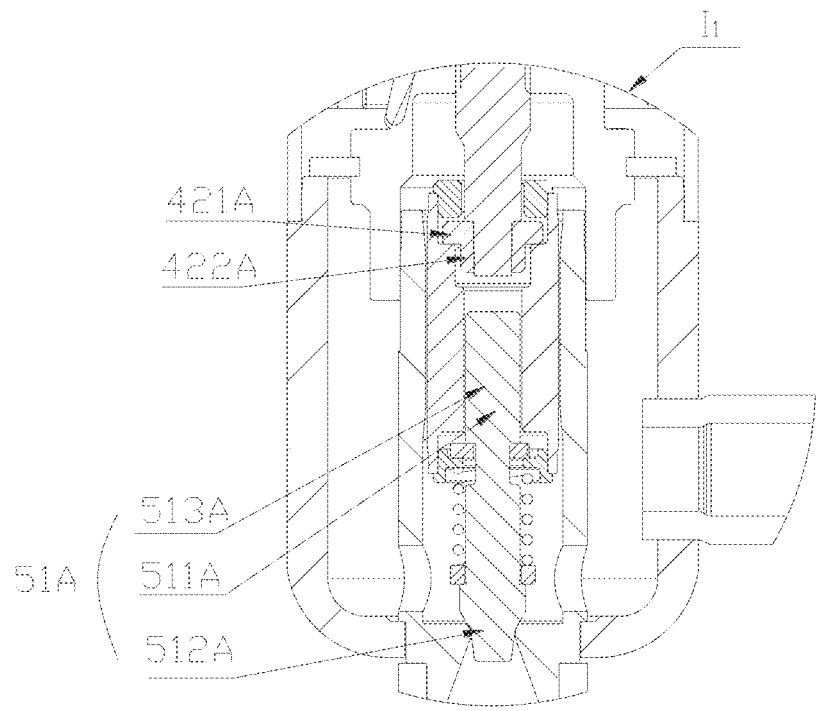
FIG. 4 is a partially enlarged view of the portion I1 in a case that the electric valve in FIG. 1 is in a second valve closed state.
Figure 5:
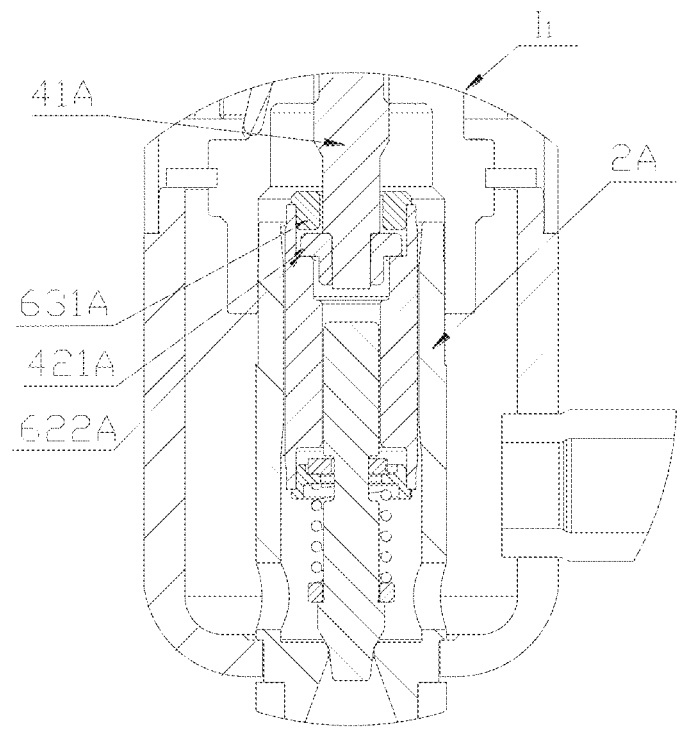
FIG. 5 is a partially enlarged view of the portion I1 in a case that the electric valve in FIG. 1 is in a third valve closed state.
Figure 6:
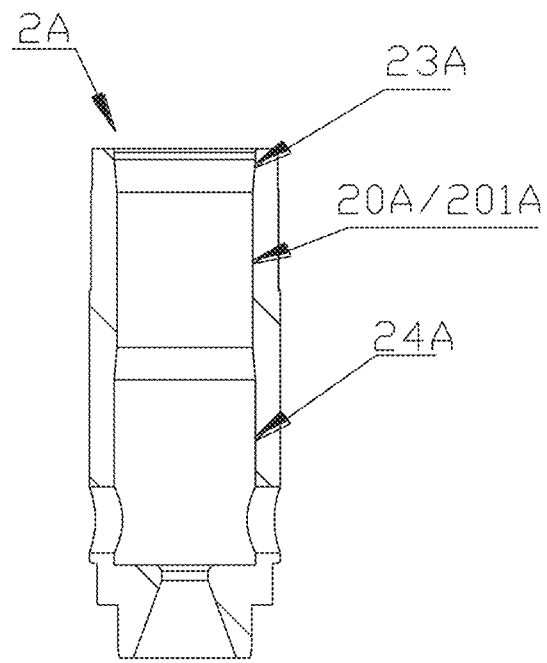
FIG. 6 is a schematic structural view of a valve core sleeve of the electric valve according to the first embodiment of the present application.
Figure 7:
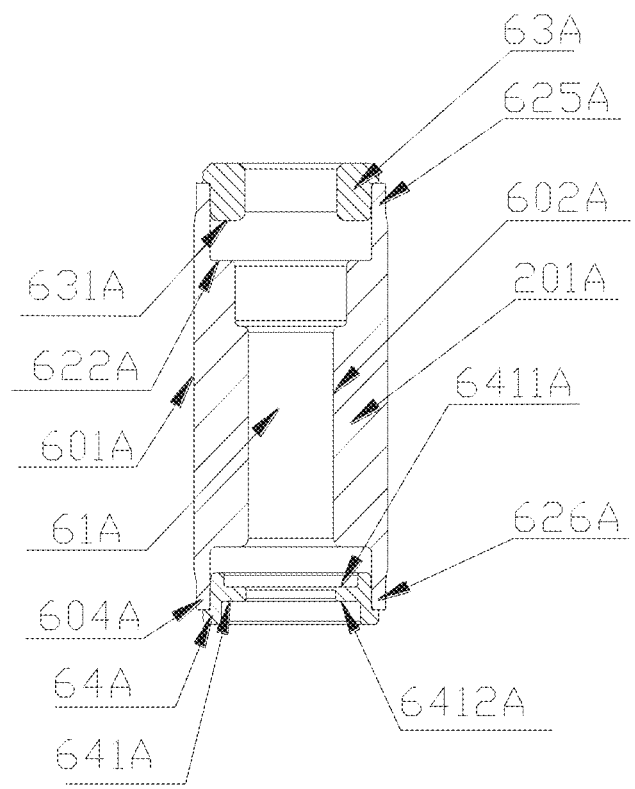
FIG. 7 is a schematic structural view of a movable connecting component of the electric valve according to the first embodiment of the present application.
Figure 16:
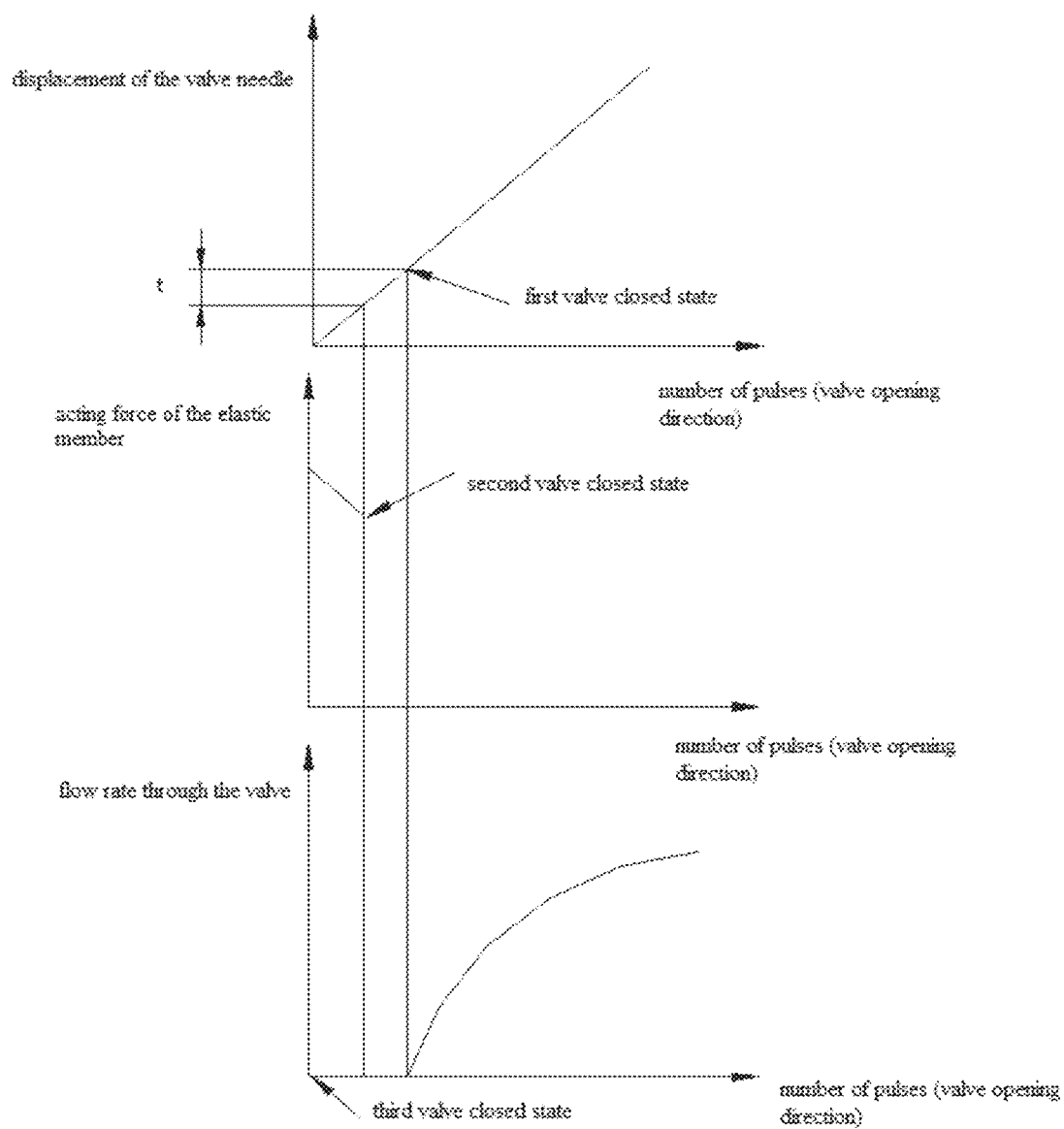
FIG. 16 is a first schematic view showing operational characteristics of the electric valve according to the present application.
Figure 17:
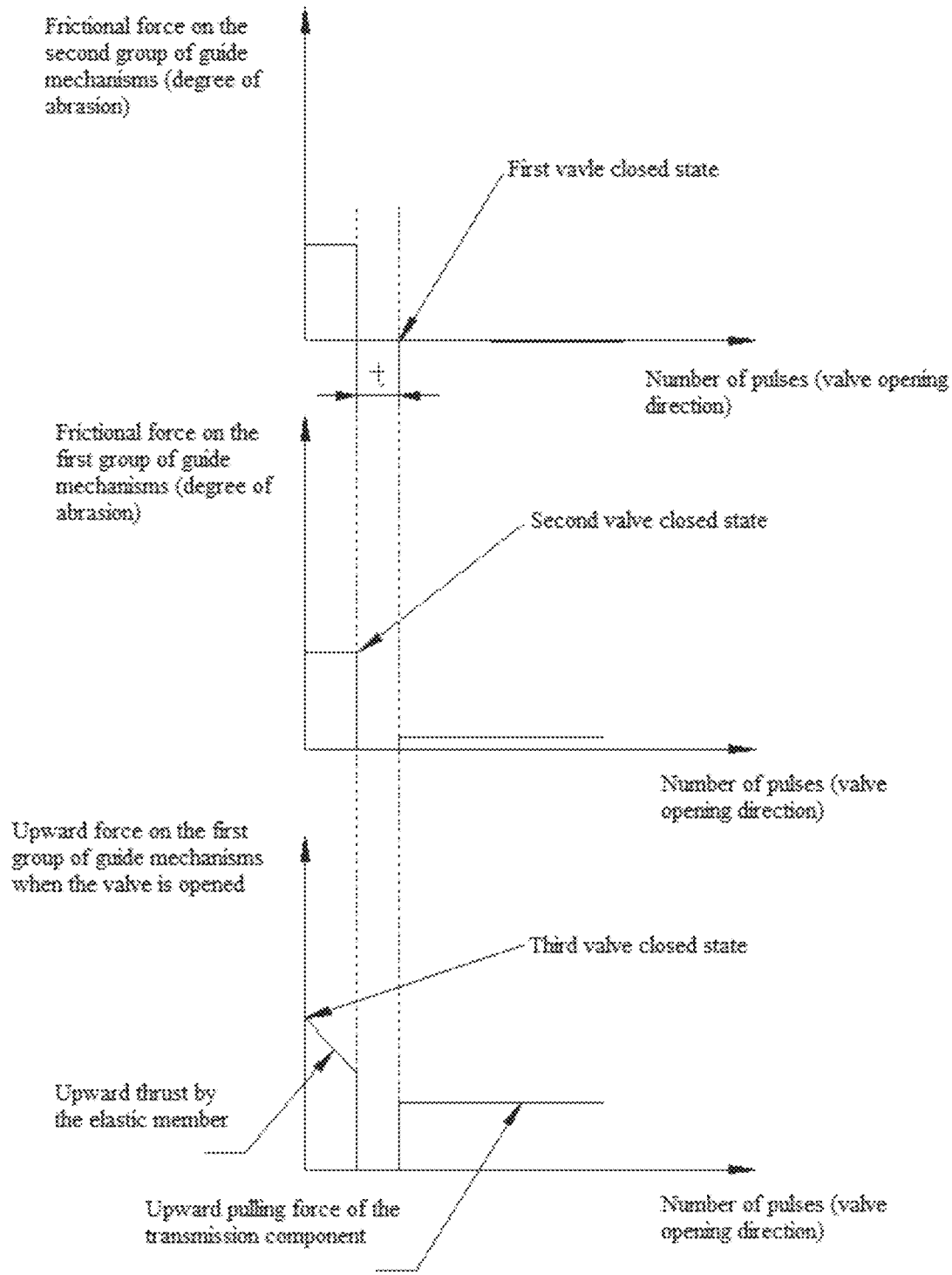
FIG. 17 is a second schematic view showing operational characteristics of the electric valve according to the present application.

Referring to FIGS. 1 to 8. FIG. 16 and FIG. 17, FIG. 1 is a schematic sectional view showing an electric valve according to a first embodiment of the present application, in which the valve is in a fully valve opened state. FIG. 2 is a partially enlarged view of a portion I1 in FIG. 1. FIG. 3 is a partially enlarged view of the portion I1 in a case that the electric valve in FIG. 1 is in a first valve closed state. FIG. 4 is a partially enlarged view of the portion I1 in a case that the electric valve in FIG. 1 is in a second valve closed state. FIG. 5 is a partially enlarged view of the portion I1 in a case that the electric valve in FIG. 1 is in a third valve closed state. FIG. 6 is a schematic structural view of a valve core sleeve of the electric valve according to the first embodiment of the present application. FIG. 7 is a schematic structural view of a movable connecting component of the electric valve according to the first embodiment of the present application. FIG. 8 is a schematic structural view showing an assembly of a valve needle component, a lower member, an elastic member and a gasket of the electric valve according to the first embodiment of the present application. FIG. 16 is a schematic view showing the operational characteristics of the electric valve according to the present application, including a relationship between the number of pulses of an electromagnetic coil and a displacement of the valve needle, a relationship between the number of pulses of the electromagnetic coil and an elastic force of an elastic member, and a relationship between the number of pulses of the electromagnetic coil and a flow rate through the valve, t represents t1 in the present embodiment. FIG. 17 is a second schematic view showing operational characteristics of the electric valve according to the present application, which shows a relationship between the number of pulses of the electromagnetic coil and the frictional forces of the first group of guide mechanisms and the second group of guide mechanisms.

In the following description of the present embodiment, a state shown in FIG. 2 in which the valve is opened is defined as a "valve opened state", and in this case, a transmission component 4A and a movable connecting component 6A are able to move with respect to each other in an axial direction by a distance denoted as t1, that is, a predetermined displacement amount in the present embodiment. A state that a valve needle component 5A closes a valve port 21A and the transmission component 4A and the movable connecting component 6A are still able to move with respect to each other in the axial direction by the distance t1 is defined as the "first valve closed state", as shown in FIG. 3. A state during a period from the "first valve closed state" shown in FIG. 3 to when an axial displacement amount of the transmission component 4A moving in the valve closing direction is less than or equal to the predetermined displacement amount t1 is defined as the "second valve closed state", and FIG. 4 is a schematic structural view when the transmission component moves from the first valve closed state by the axial displacement amount equal to t1. A state that the axial displacement amount of the transmission component 4A moving from the "first valve closed state" in the valve closing direction is greater than the predetermined displacement amount t1 is defined as the "third valve closed state", as shown in FIG. 5.

As shown in FIGS. 1 and 2, the electric valve includes a valve body component 1A having a valve chamber 11A, a drive component 3A, a transmission component 4A, a valve needle component 5A, a movable connecting component 6A, an elastic member 7A, and a nut component 8A. The valve body component 1A includes an upper valve body 12A, a lower valve body 13A and a valve core sleeve 2A, the upper valve body 12A is fixed to the lower valve body 13A by welding to form the valve chamber 11A, a first connecting tube is connected to the lower valve body 13A, and the valve core sleeve 2A is fixedly connected to the lower valve body 13A. In the present embodiment, the valve core sleeve 2A and the lower valve body 13A are two separate components which are fixed to each other by welding. It is conceivable that the valve core sleeve 2A may be integrated with the lower valve body 13A, that is, the two are processed into one part. The valve core sleeve 2A is provided with a valve port 21A, the valve port 21A is substantially arranged in the valve chamber 11A, a lower end portion of the valve core sleeve 2A extends out of the valve chamber 11A and is connected with a second connecting tube, that is, in the present embodiment, the valve core sleeve 2A is partially arranged in the valve chamber 11A. The movable connecting component 6A is in sliding clearance fit with the valve core sleeve 2A and at least partially arranged in the valve core sleeve 2A, and the valve core sleeve 2A is a structure which is substantially through in an axial direction. The movable connecting component 6A is suspendingly connected with the transmission component 4A, and the movable connecting component 6A is able to be driven by the transmission component 4A to axially move with respect to the valve core sleeve 2A. An end of the valve needle component 5A extends into the movable connecting component 6A, and the movable connecting component 6A supports the valve needle component 5A. The valve needle component 5A is suspendingly connected with the movable connecting component 6A, and the valve needle component 5A is able to be driven by the movable connecting component 6A to axially move with respect to the valve core sleeve 2A. The elastic member 7A is sleeved on an outer periphery portion of the valve needle component 5A, one end of the elastic member 7A abuts against the movable connecting component 6A, and the other end abuts against the valve needle components 5A.

The nut component 8A includes a nut 81A having an internally threaded hole, a spring guide rail 82A fixed to a periphery portion of the nut 81A, and a slip ring 83A. The slip ring 83A is able to slip axially along the spring guide rail 82A. The nut 81A is fixedly connected to an upper end portion of the lower valve body 13A through a connecting piece 84A. The nut component 8A is sleeved on an outer periphery of the transmission component 4A and is in threaded transmission connection with the transmission component 4A. The drive component 3A includes an electromagnetic coil 34A, a rotor 31A, a connecting seat 32A fixedly connected to the rotor 31A, and a stop rod 33A fixedly connected to the connecting seat 32A. The electromagnetic coil 3A is fixedly connected to the valve body component 1A by a connecting bracket (not shown). The electromagnetic coil 3A provides a pulse signal. The rotor 31A of the drive component 3A is arranged on the outer periphery of the nut component 8A, the rotor 31A is fixedly connected with the transmission component 4A, and coordinates with the electromagnetic coil 34A to drive the transmission component 4A to move in the axial direction of the valve body component 5A. In a case that the rotor component 3A drives the transmission component 4A to reciprocate in the axial direction of the valve body component 1A, the valve needle component 5A and the movable connecting component 6A can correspondingly move to regulate an opening degree of the valve port 21A of the electric valve.

In order to allow the valve needle component 5A to be accurately aligned with the valve port 21A and improve the valve closing reliability, in the electric valve of the present embodiment, the valve core sleeve 2A includes a first guide inner wall, the movable connecting component 6A includes a first guide outer wall in sliding clearance fit with the first guide inner wall, the movable connecting component 6A further includes a second guide inner wall, and the valve needle component 5A includes a second guide outer wall in sliding clearance fit with the second guide inner wall. It is defined that, the first guide inner wall and the first guide outer wall form a first group of guide mechanisms, and the second guide inner wall and the second guide outer wall form a second group of guide mechanisms.

Specifically, as shown in FIG. 2 and FIGS. 6 to 8, the valve core sleeve 2A is a structure having a first central through hole and a cylindrical inner wall. A hole wall of the first central through hole includes a first guide inner wall 201A. The movable connecting component 6A is at least partially arranged in the first central through hole. In the present embodiment, an upper end of the movable connecting component 6A extends out of the valve core sleeve 2A, that is, the movable connecting component 6A is partially arranged in the valve core sleeve 2A. An outer wall of the movable connecting component 6A includes a first guide outer wall 601A in sliding clearance fit with the first guide inner wall 201A. In this way, the valve core sleeve 2A is in guiding fit with the movable connecting component 6A through the first guide inner wall and the first guide outer wall, that is, the movable connecting component 6A is guided by the first guide inner wall 201A of the valve core sleeve 2A.

The movable connecting component 6A includes a second guide inner wall 602A. An end of the valve needle component 5A extends into the movable connecting component 6A. The valve needle component 5A has a second guide outer wall 502A in sliding clearance fit with the second guide inner wall 602A. In this way, the movable connecting component 6A is in guiding fit with the valve needle component 5A through the second guide inner wall 602A and the second guide outer wall 502A, that is, the valve needle component 5A is guided by the second guide inner wall 602A of the movable connecting component 6A.

In the electric valve, the valve core sleeve 2A guides the movable connecting component 6A by the cooperation between the first guide inner wall 201A and the first guide outer wall 601A, and the movable connecting component 6A guides the valve needle component 5A by the cooperation between the second guide inner wall 602A and the second guide outer wall 502A. In this way, the valve needle component 5A is indirectly guided by the valve core sleeve 2A by the arrangement of the two groups of guide mechanisms, so that the valve needle component is more accurately aligned with the valve port, and the valve closing reliability is improved.

Further, since a frictional force is generated between the first guide inner wall 201A and the first guide outer wall 601A and also between the second guide inner wall 602A and the second guide outer wall 502A at a final stage of valve closing (that is, in the process of the valve changing from the second valve closed state to the third valve closed state described above), the valve opening is adversely affected. Therefore, in order to improve the valve opening reliability, the electric valve of the present embodiment further includes the elastic member 7A, and the elastic member 7A is sleeved outside the valve needle component 5A, one end of the elastic member 7A abuts against the movable connecting component 6A, and the other end abuts against the valve needle component 5A. In this way, at the very moment when the electric valve is opened (that is, in the process of the valve changing from the third valve closed state to the second valve closed state), the elastic force of the elastic member 7A generates an upward thrust effect on the movable connecting component 6A, which is helpful to overcome the aforementioned frictional force, allows the movable connecting component 6A to move upward more easily, and avoids the valve jam caused by the aforementioned friction. It is easier to open the valve, the operation of the valve needle component is stable, the abrasion of a contact portion between the valve needle component 5A and the valve port 21A is reduced, an internal leakage rate of the electric valve is reduced, and the sealing performance of the valve is improved.

Further, the transmission component 4A includes a first radial protrusion, and the movable connecting component 6A includes a first suspension portion. The first radial protrusion suspendingly supports the first suspension portion, and the first radial protrusion is able to abut against or be separated from the first suspension portion, so that the transmission component 4A suspendingly supports the movable connecting component 6A, that is, the transmission component 4A is suspendingly connected with the movable connecting component 6A. The movable connecting component 6A further includes a second radial protrusion, and the valve needle component 5A includes a second suspension portion. The second radial protrusion suspendingly supports the second suspension portion, and the second radial protrusion is able to abut against or be separated from the second suspension portion, so that the movable connecting component 6A suspendingly supports the valve needle component 5A, that is, the movable connecting component 6A is suspendingly connected with the valve needle component 5A. The movable connecting component 6A includes a stop portion arranged below the first radial protrusion, and when the transmission component 4A moves in the valve closing direction, the first radial protrusion is able to abut against the stop portion.

Specifically, when the transmission component 4A moves to a position where the first radial protrusion abuts against the first suspension portion and the second radial protrusion abuts against the second suspension portion, the transmission component 4A can drive the movable connecting component 6A to move upward in the axial direction, and the movable connecting component 6A can drive the valve needle component 5A to move upward in the axial direction.

When the transmission component 4A moves in the valve closing direction from the valve opened state, as the transmission component 4A moves downward, the movable connecting component 6A and the valve needle component 4A move downward with the transmission component 4A due to the action of their own gravities, that is, the three components move together until the valve reaches the first valve closed state in which the valve port 21A is closed by the valve needle component 5A. During a time period from when the valve needle component 5A closes the valve port 21A to when the transmission component 4A moves toward the valve closing direction by a predetermined displacement amount t1, the elastic member 7A does not generate an elastic force for pushing the valve needle component 5A toward the valve port 21A; and during a time period from when the valve needle component 5A closes the valve port 21A to when the transmission component 4A moves in the valve closing direction by a displacement amount greater than the predetermined displacement amount t1, that is, after the transmission component 4A moves in the valve closing direction to a position where the first radial protrusion abuts against the stop portion, the transmission component 4A pushes the movable connecting component 6A to move in the valve closing direction, and the elastic member 7A pushes the valve needle component 5A toward the valve port 21A.

Thus, during the time period from when the valve needle component 5A closes the valve port 21A to when the transmission component 4A moves in the valve closing direction by a displacement amount no greater than the predetermined displacement amount t1 and at the very moment when the electric valve is opened, a frictional force generated between the valve needle component 5A and the valve port 21A is caused by the gravity of the valve needle component 5A, and an abrasion loss of a contact surface between the valve needle component 5A and the valve port 21A is small, thereby reducing the internal leakage of the electric valve, which can also avoid leakage of the valve port in a fully closed state even if the electric valve operates repeatedly, and thereby ensuring the sealing performance of the valve.

Moreover, before the valve is closed, the valve needle component 5 and the transmission component 4A are not affected by the spring force of the elastic member 7A. The valve needle component 5A and the movable connecting component 6A do not rotate together with the transmission component 4A. Almost no frictional force is present between the valve core sleeve 2A and the movable connecting component 6A and between the movable connecting component 6A and the valve needle component 5A, which can further reduce the valve opening resistance.

The working principle of the electric valve of the present embodiment is as follows:

During a process that the transmission component 4A moves in the valve closing direction from the valve opened state shown in FIG. 2 to a state that the valve needle component closes the valve port 21A, that is, the first valve closed state shown in FIG. 3, the movable connecting component 6A and the valve needle component 5A move together with the transmission component 4A under the action of their own gravities, and the first guide inner wall 201A moves axially relative to the first guide outer wall 601A and is in guiding fit with the first guide outer wall 601A. At this time, although abrasion is present between the first guide inner wall 201A and the first guide outer wall 601A, the frictional force is only generated by the gravity of the movable connecting component 6A itself, and a degree of the abrasion is extremely small. Moreover, the elastic member 7A does not generate the elastic force for pushing the valve needle component 5A toward the valve port 21A.

Then, during the second valve closed state, that is, during a process that the valve changes from the state shown in FIG. 3 to the state shown in FIG. 4, the transmission component 4A moves downward, that is, the transmission component 4A moves axially, with respect to the movable connecting component 6A, in the valve closing direction within the predetermined displacement amount t1. During the downward movement of the transmission component 4A, positions of the movable connecting component 6A and the valve needle component 5A are kept unchanged, the first guide inner wall 201A is in guiding fit with the first guide outer wall 601A and the second guide inner wall 602A is in guiding fit with the second guide outer wall 502A, and no relative displacement and no frictional force is generated therebetween. Moreover, the elastic member 7A does not generate the spring force for pushing the valve needle component 5A toward the valve port 21A, and there is no abrasion for the contact portion between the valve needle component 5A and the valve port 21A.

Then, during the third valve closed state, during a process that the transmission component 4A continues to move in the valve closing direction from the state shown in FIG. 4 to the state shown in FIG. 5, the transmission component 4A pushes the movable connecting component 6A, and the movable connecting component 6A pushes the elastic member 7A, to move together in the valve closing direction. During this process, the movable connecting component 6A moves downward with respect to the valve core sleeve 2A, the movable connecting component 6A is in guiding fit with the valve core sleeve 2A through the first guide inner wall 201A and the first guide outer wall 601A, abrasion occurs between the first guide inner wall 201A and the first guide outer wall 601A, and a frictional force is generated. The movable connecting component 6A moves downward with respect to the valve needle component 5A, the movable connecting component 6A is in guiding fit with the valve needle component 5A through the second guide inner wall 602A and the second guide outer wall 502A, abrasion occurs between the second guide inner wall 602A and the second guide outer wall 502A, and a frictional force is generated therebetween. Moreover, during this process, the elastic member 7A is deformed under pressure to generate the spring force for pushing the valve needle component 5A toward the valve port 21A, further improving the valve closing reliability and improving the sealing performance when the valve is closed.

During the valve opening process, when the electric valve changes from the state shown in FIG. 5 to the state shown in FIG. 4, that is, during a process that the electric valve changes from the third valve closed state to the second valve closed state shown in FIG. 4, the movable connecting component 6A is pushed upward by the spring force of the elastic member 7A, thereby easily overcoming the frictional force generated during the third valve closed state of valve closing and avoiding the valve jam caused by the friction when the valve is opened. In the process from the second valve closed state to the state that the valve is fully opened shown in FIG. 2, almost no frictional force is present between the first guide inner wall 201A and the first guide outer wall 601A and between the second guide inner wall 602A and the second guide outer wall 502A, so the valve is not jammed during this valve opening process, and the valve can be opened freely.

In the whole process, the valve core sleeve 2A guides the movable connecting component 6A by the cooperation between the first guide inner wall 201A and the first guide outer wall 601A, and the movable connecting component 6A guides the valve needle component 5A by the cooperation between the second guide inner wall 602A and the second guide outer wall 502A, so that the valve closing reliability and the valve opening reliability are improved, and the sealing performance when the valve is closed is also improved.

It can be seen from the above that the electric valve of the present embodiment has the following advantages:

On the one hand, by the cooperation between the first guide inner wall 201A and the first guide outer wall 601A and the guide cooperation between the second guide inner wall 602A and the second guide outer wall 502A, the valve needle component 5A is more accurately aligned with the valve port during the movement process, the valve closing reliability is improved, and the operation reliability of the valve needle component is improved.

On the other hand, since frictional force is generated between the first guide inner wall 201A and the first guide outer wall 601A and between the second guide inner wall 602A and the second guide outer wall 502A during the third valve closed state of valve closing, the frictional force adversely affects the valve opening operation performance. To this end, in the present embodiment, the elastic member 7A is arranged outside the valve needle component 5A, one end of the elastic member abuts against the movable connecting component 6A, and the other end of the elastic member abuts against the valve needle component 5A. Then, during the valve opening process, the movable connecting component 6A is pushed upward by the spring force of the elastic member 7A, which is helpful to overcome the aforementioned frictional force, avoids the valve jam caused by the friction when the valve is opened, and improves the valve opening reliability.

Furthermore, the transmission component 4A is suspendingly connected with the movable connecting component 6A, and the movable connecting component 6A is suspendingly connected with the valve needle component 5A. During a time period from when the valve needle component 5A closes the valve port 21A to when the transmission component 4A moves in the valve closing direction by the predetermined displacement amount t1, the elastic member 7A does not generate the spring force for pushing the valve needle component 5A toward the valve port 21A. During a time period from when the valve needle component 5A closes the valve port 21A to when the transmission component 4A moves in the valve closing direction by a displacement amount greater than the predetermined displacement amount t1 the elastic member 7A generates the spring force for pushing the valve needle component 5A toward the valve port 21A. In this way, abrasion for the contact portion between the valve needle component 5A and the valve port 21A only occurs during the third valve closed state, and there is no abrasion for the contact portion between the valve needle component 5A and the valve port 21A in the process of the valve changing from the valve opened state to the first valve closed state and in the process of the valve changing from the first valve closed state to the second valve closed state, thereby further reducing the internal leakage between the valve needle component 5A and the valve port 21A. Moreover, during the valve opening process, a similar situation occurs when the valve needle 51A is separated from the valve port 21A. At the very moment when the valve needle 51A and the valve port 21A are being separated from each other, the frictional force between the valve needle 51A and the valve port 21A is caused only by the self-weights of the valve needle component 5A and the movable connecting component 6A, and even if the electric valve is repeatedly operated, there is very little abrasion at the contact portion between the valve needle 51A and the valve port 21A, thereby improving the sealing performance of the valve.

Specific structural designs of the components such as the transmission component 4A, the valve needle component 5A and the movable connecting component 6A in the present embodiment are described in detail hereinafter.

As shown in FIGS. 2, 3, 6 and 7, the movable connecting component 6A includes a substantially cylindrical connecting body 62A, an upper end portion of the connecting body 62A has an upper opening portion 603A, a lower end portion of the connecting body 62A has a lower opening portion 604A, and the upper opening portion is in communication with the lower opening portion. Apparently, the upper opening portion may not be in communication with the lower opening portion as long as the object of the present application can be achieved. The movable connecting component 6A further includes an upper member 63A fixed to the upper opening portion 603A and a lower member 64A fixed to the lower opening portion 604A. One end of the elastic member 7A abuts against the lower member 64A. The upper member 63A is provided with the first suspension portion, the lower member 64A is provided with the second radial protrusion, and specifically the elastic member 7A abuts against a lower end face portion of the second radial protrusion.

A cross section of an outer wall of the connecting body 62A may be circular, the connecting body 62A includes the first guide outer wall 601A and further includes an accommodating hole 61A in communication with the lower opening portion 604A, and a hole wall of the accommodating hole 61A includes the second guide inner wall 602A. The connecting body 62A includes a first annular protrusion 622A of which an upper end face portion is opposite to the first radial protrusion, and the first annular protrusion serves as the stop portion in the present embodiment. The upper end face portion of the stop portion is able to abut against the lower end face portion of the first radial protrusion of the transmission component 4A.

The upper member 63A is specifically a first annular member having an axial through hole. The upper member 63A is sleeved on a periphery of the transmission component 4A and is fixed to the upper opening portion 603A of the connecting body 62A by press-fitting or welding or a combination of press-fitting and welding. The first annular member includes a first annular portion 631A, which serves as the first suspension portion of the present embodiment.

When the upper member 63A is fixed to the upper opening portion of the connecting body 62A by welding, in order to avoid the welding position and nearby portions from adversely affecting on the guide effect between the first guide inner wall 201A and the first guide outer wall 601A after the upper member 63A is welded to the connecting body 62A, a first small-diameter portion 20A is provided on an inner wall of the valve core sleeve 2A, the first small-diameter portion 20A includes the first guide inner wall 201A, and a first diameter-expanded portion 23A with a diameter greater than that of the first small-diameter portion 20A is provided above the first small-diameter portion 20A; or, the outer wall of the connecting body 62A includes a first large-diameter portion 624A and a first diameter-reduced portion 625A arranged above the first large-diameter portion 624A, the first large-diameter portion 624A includes the first guide outer wall 601A, and the first diameter-reduced portion 625A is fixed to the upper member 63A by welding; or, a first small-diameter portion 20A is provided on the inner wall of the valve core sleeve 2A, the first small-diameter portion 20A includes the first guide inner wall 201A, a first diameter-expanded portion 23A with a diameter greater than that of the first small-diameter portion 20A is provided above the first small-diameter portion 20A, and, the outer wall of the connecting body 62A includes a first large-diameter portion 624A and a first diameter-reduced portion 625A arranged above the first large-diameter portion 624A, the first large-diameter portion 624A includes the first guide outer wall 601A, and the first diameter-reduced portion 625A is fixed to the upper member 63A by welding.

The lower member 64A is fixed to the lower opening portion 604A of the connecting body 62A by press-fitting, or welding, or the combination of press-fitting and welding. In the present embodiment, the lower member 64A is specifically a base member having an axial through hole, and the base member is sleeved on a periphery portion of the valve needle component 5A. More specifically, the base member has an "H"-shaped structure having an axial through hole. The middle inner wall of the base member extends radially to form a second annular portion 641A having an upper end surface portion 6411A and a lower end surface portion 6412A. The second annular portion 641A serves as the second radial protrusion in the present embodiment, and the upper end surface portion 6411A of the second annular portion is configured to abut against a lower clamping member described hereinafter. An accommodating groove is formed between the lower end face portion 6412A and a part of an inner side wall, located below second annular portion 641A, of the connecting body 62A, and one end of the elastic member 7A is located in the accommodating groove and abuts against the lower end face portion 6412A. In order to avoid the welding position from adversely affecting on the guide effect between the first guide inner wall 201A and the first guide outer wall 601A after the lower member 64A is welded to the connecting body 62A, the inner wall of the valve core sleeve 2A further includes a second diameter-expanded portion 24A with a diameter greater than that of the first small-diameter portion 20A arranged below the first small-diameter portion 20A; or, the outer wall of the connecting body 62A includes a second diameter-reduced portion 626A arranged below the first large-diameter portion 624A, and the second diameter-reduced portion 626A is fixed to the lower member 64A by welding; or, the inner wall of the valve core sleeve 2A includes a second diameter-expanded portion 24A with a diameter greater than that of the first small-diameter portion 20A arranged below the first small-diameter portion 20A, and, the outer wall of the connecting body 62A includes a second diameter-reduced portion 626A arranged below the first large-diameter portion 624A, and the second diameter-reduced portion 626A is fixed to the lower member 64A by welding.

As a specific solution, in the present embodiment, the valve core sleeve 2A is provided with the first diameter-expanded portion 23A and the second diameter-expanded portion 24A, two end portions of a connecting body 62B are respectively provided with the first diameter-reduced portion 625A and the second diameter-reduced portion 626A for respectively avoiding the welding positions of the welding of an upper member 63B and a lower member 64B from adversely affecting on the guide function of the first group of guide mechanisms and the second group of guide mechanisms.

As shown in FIGS. 3 and 4, the transmission component 4A includes a transmission shaft 41A and an upper clamping member 42A that is sleeved and fixed to a lower end portion of the transmission shaft 41A. The upper clamping member 42A is a sleeve member having a central through hole cooperating with the transmission shaft 41A. The sleeve member includes a large-diameter ring portion 421A located between the upper member 63A and the first annular protrusion 622A, and further includes a small-diameter ring portion 422A extending downward from a lower end surface portion of the large-diameter ring portion 421A and having a diameter smaller than that of the large-diameter ring portion 421A. The large-diameter ring portion 421A serves as the first radial protrusion in the present embodiment. In the present embodiment, the upper clamping member 42A is fixed to a lower end portion of the transmission shaft 41A by welding, and the small-diameter ring portion 422A is arranged to facilitate welding between the upper clamping member 42A and the transmission shaft 41A. It is conceivable that, the upper clamping member 42A may not be provided with the small-diameter ring portion 422A, or the transmission component 4A may adopt a transmission component with a structure in the second specific embodiment of the present application, that is, the upper clamping member is not separately provided, and it is also applicable to directly form a boss extending radially at the lower end portion of the transmission shaft to serve as the first radial protrusion.

An accommodating space 611A is provided between the upper member 62A and the first annular protrusion 622A. The large-diameter ring portion 421A of the transmission component 4A is able to move axially within the accommodating space 611A. In a case that the electric valve is in the valve opened state or the first valve closed state, the first suspension portion 631A of the upper member 63A abuts against an upper end surface portion of the large-diameter ring portion 421A (the first radial protrusion) of the transmission component 4A, and the transmission component 4A suspendingly supports the movable connecting component 6A. In this case, an axial distance between the lower end surface portion of the large-diameter ring portion 421A of the transmission component 4A and an upper end surface of the first annular protrusion 622A (the stop portion) is the predetermined displacement amount t1 described in the present embodiment, and the predetermined displacement amount t1 may be determined according to actual needs.

As shown in FIGS. 4, 7 and 8, the valve needle component 5A includes the valve needle 51A, and specifically, the valve needle 51A includes a flow regulating portion 512A in contact with or separated from the valve port 21A, a guide portion 513A extending into the accommodating hole 61A, and a main body portion 511A located between the guide portion 513A and the flow regulating portion 512A. An outer wall of the guide portion 513A includes the second guide outer wall 502A. The second guide outer wall 502A is in sliding clearance fit with the second guide inner wall 602A. The main body portion 511A and the flow regulating portion 512A together form a first stepped portion 514A. The first stepped portion 514A is provided with a gasket 53A. The elastic member 7A is sleeved on a periphery of the main body portion 511A, and the other end of the elastic member 7A directly abuts against the gasket 53A and indirectly abuts against the main body portion 511A. Herein, it is conceivable that, the gasket 53A may be arranged in the accommodating groove of the lower member 64A, or gaskets 53A may be respectively arranged in the accommodating groove and the first stepped portion 514A. The function of the gasket 53A is to reduce the frictional force between the elastic member 7A and the lower member 64A or between the elastic member 7A and the valve needle 51A, thereby reducing the frictional force between the valve needle component 5A and the transmission component 4A, preventing the valve needle 51A from rotating with the transmission component 4A, and reducing the abrasion of the contact portion between the valve needle 51A and the valve port 21A. It should be noted that, the "flow regulating portion" described herein refers to a portion which is able to cooperate with the valve port 21A and regulate the flow of the electric valve. The main body portion refers to a portion located between the flow regulating portion and the guide portion.

The valve needle component 5A further includes a lower clamping member 52A arranged in the lower opening portion 604A and sleeved on the periphery portion of the main body portion 511A of the valve needle 51A. A lower end surface portion of the lower clamping member 52A for cooperating with the lower member 64A serves as a second suspension portion 521A. Specifically, the main body portion 511A of the valve needle 51A is provided with an annular recess 5111A at an upper end portion connected to the guide portion 513A. The lower clamping member 52A is a C-shaped insert piece, and is inserted on a periphery of the annular recess 5111A, and located between the guide portion 513A and the lower member 64A. A lower end surface of the lower clamping member is able to abut against an upper end surface of the lower member 64A. The function of the lower clamping member 52A is similar to allowing a radial protruding ring with a notch to be formed at the periphery portion of the valve needle 51A. The lower clamping member abuts against the second radial protrusion 641A to enable the movable connecting component 6A to suspendingly support the valve needle component 5A.

As described above, the lower clamping member 52A and the valve needle 51A are two separate members. Apparently, the above two members may be integrally formed in the case of not affecting the assembly.

It should be noted herein that, in a case that the lower clamping member 52A and the valve needle 51A are two separate members, the lower clamping member 52A may be fixedly or movably connected to the valve needle 51A. In a case that the lower clamping member 52A is movably connected to the valve needle 51A, the lower clamping member 52A is merely required to be sleeved on the periphery of the guide portion 513A, and the lower clamping member 52A is able to move axially with respect to the guide portion 512A, as shown in the present embodiment.

In practical arrangement, the upper clamping member 42A and the lower clamping member 52A may not be configured as the above structure, as long as the upper clamping member 42A and the lower clamping member 52A are configured to cooperate with corresponding structures to achieve the above connection requirements.

In addition, a predetermined radial displacement amount is specifically provided between the lower clamping member 52A and the lower member 64A, that is, a certain displacement space in the radial direction is provided between the lower clamping member 52A and the lower member 64A. In this way, center alignment of the valve needle 51A can be automatically performed, so as to enable the flow regulating portion 512A of the valve needle 51A to cooperate with the valve port 21A more easily.

Similarly, in practical arrangement, a predetermined radial displacement amount may also be provided between the transmission component 41A and the movable connecting component 6A, so that center alignment of the transmission shaft 41A and the upper clamping member 42A can be performed self-adaptively.

Specific structures of the transmission component 4A, the valve needle component 5A and the movable connecting component 6A in the present embodiment have been described in detail hereinbefore. Operations of the electric valve in the present embodiment from the valve opened state shown in FIG. 2 to the valve tightly closed state shown in FIG. 5 will be described in detail hereinafter in conjunction with FIGS. 16 and 17.

An operating process of the valve from the valve opened state shown in FIG. 2 to the first valve closed state shown in FIG. 3 is as follows.

As shown in FIGS. 1 and 2, the electric valve is in the valve opened state in which the valve needle 51A is separated from the valve port 21A. In the valve opened state, the large-diameter ring portion 421A (the first radial protrusion) of the upper clamping member 42A of the transmission component 4A abuts against the first annular portion 631A of the upper member 63A of the movable connecting component 6A, such that the transmission component 4A suspendingly supports the movable connecting component 6A. The radial predetermined displacement amount t1 is provided between the lower end surface portion of the large-diameter ring portion 421A and the first annular portion 622A (the stop portion) of the connection body 62A. A lower end surface portion of the second suspension portion 521A of the lower clamping member 52A abuts against the upper end surface portion 6411A of the second annular portion 641A (the second radial protrusion) of the lower member 64A, such that the movable connecting component 6A suspendingly supports the valve needle component 5A.

Starting from the valve opened state, the drive component 3A of the electric valve drives the transmission component 4A to move in the valve closing direction until the flow regulating portion 512A of the valve needle 51A comes into contact with the valve port 21A to close the valve port 21A, that is, until reaching the first valve closed state shown in FIG. 3. In the above process, the transmission component 4A, the movable connecting component 6A, the elastic member 7A and the valve needle component 5A together may be seen as an integral body moving axially in the valve closing direction, a relationship among relative positions of the transmission component 4A, the movable connecting component 6A, the valve needle component 5A, and the elastic member 7A is the same as that in the valve opened state shown in FIG. 2, and the four members move downward together with respect to the valve core sleeve 2A.

In the above process, on the one hand, since the movable connecting component 6A does not move axially with respect to the valve needle component 5A, there is no abrasion between the second guide inner wall 602A and the second guide outer wall 502A. On the other hand, since the movable connecting component 6A moves axially with respect to the valve core sleeve 2A. At this time, the two realize the guiding fit through the first guide inner wall 201A and the first guide outer wall 601A. Although abrasion is present between the first guide inner wall 201A and the first guide outer wall 601A during the guiding fit process, the frictional force is only generated by the gravity of the movable connecting component 6A itself, and a degree of the abrasion is extremely small. Furthermore, the axial predetermined displacement amount t1 is still provided between the lower end surface portion of the large-diameter ring portion 421A of the upper clamping member 42A and the stop portion of the connecting body 62A, the elastic member 7A is not compressed and does not generate the elastic force for pushing the valve needle component 5A toward the valve port 21A, the valve needle component 5A closes the valve port 21A under the action of its own gravity, the valve needle 51A and the valve port 21A are not affected by the elastic force of the elastic member 7A, and even if the valve needle 51A rotates, the valve port 21A is only subjected to a frictional force caused by self-weights of the valve needle component 5A and the movable connecting component 6A, which brings very little abrasion to a contact surface between the valve needle 51A and the valve port 21A.

An operating process of the valve from the first valve closed state shown in FIG. 3 to the second valve closed state shown in FIG. 4 is as follows.

Starting from the first valve closed state shown in FIG. 3 in which the valve needle 51A closes the valve port 21A, pulses are supplied for closing the valve, the drive component 3A further drives the transmission component 4A to move axially in the valve closing direction, and due to the predetermined displacement amount t1 between the large-diameter ring portion 421A (the first radial protrusion) of the upper clamping member 42A and the first annular protrusion 622A (the stop portion), a relationship among positions of the movable connecting component 6A, the valve needle component 5A and the valve port 21A does not change. That is, there is no axial relative movement between the valve core sleeve 2A and the movable connecting component 6A and between the movable connecting component 6A and the valve needle component 5A, and only the transmission component 4A moves axially downward in the valve closing direction. An end point of the second valve closed state is reached when the transmission component 4A moves downward to a position where the large-diameter ring portion 421A (the first radial protrusion) of the upper clamping member 42A abuts against the first annular protrusion 622A (the stop portion) of the connecting body 62A. That is, the second valve closed state is a process in which the displacement amount of the transmission component 4A moving in the valve closing direction from the first closed valve state is less than or equal to the predetermined displacement amount t1. FIG. 4 is a view showing the state that the displacement amount of the transmission component 4A is equal to the predetermined displacement amount t1, which is a very moment when the large-diameter ring portion 421A of the upper clamping member 42A just comes into contact with the first annular protrusion 622A of the movable connecting component 6A but does not apply a force to the first annular protrusion 622A.

In the above process, on the one hand, there is no frictional force between the first guide inner wall 201A and the first guide outer wall 601A and between the second guide inner wall 602A and the second guide outer wall 502A; and on the other hand, the elastic member 7A does not generate the spring force for pushing the valve needle component 5A toward the valve port 21A, which means that the contact surface between the valve needle 51A and the valve port 21A is not affected by the spring force of the elastic member 7A. During the entire process of the second valve closed state, even if the valve needle 51A rotates, the valve port 21A is only subjected to the frictional force caused by the self-weights of the valve needle component 5A and the movable connecting component 6A, which brings very little abrasion to the contact surface between the valve needle 51A and the valve port 21A.

An operating process of the valve from the second valve closed state shown in FIG. 4 to the third valve closed state shown in FIG. 5 is as follows.

Starting from the second valve closed state shown in FIG. 4, pulses are supplied for closing the valve, the drive component 3A further drives the transmission component 4A to move axially in the valve closing direction. Since the large-diameter ring portion 421 (the first radial protrusion) of the upper clamping member 42A of the transmission component 4A abuts against the first annular protrusion 622A (the stop portion) of the connecting body 62A, the movable connecting component 6A is pressed by the transmission component 4A to move downward during the downward movement of the transmission component 4A, such that the elastic member 7A is compressed and deformed to generate the elastic force for pushing the valve needle 51A toward the valve port 21A, the spring force enables the valve needle 51A to seal the valve port 21A more reliably, to tightly close the valve port 21A, and thereby improving the valve closing reliability.

In the process, since the elastic member 7A is compressed, in a case that the frictional force between the valve needle 51A and the transmission component 4A is greater than the frictional force between the valve needle 51A and the valve port 21A, the valve needle 51A rotates together with the transmission component 4A with respect to the valve port 21A, and there is abrasion at a portion where the valve port 21A is in contact with the valve needle 51A. In a case that the frictional force between the valve needle 51A and the transmission component 4A is smaller than the frictional force between the valve needle 51A and the valve port 21A, the valve needle 51A does not rotate together with the transmission component 4A, then there is very little abrasion at the portion where the valve port 21A is in contact with the valve needle 51A. Therefore, in order to reduce the frictional force between the valve needle 51A and the transmission component 4A, the gasket 53A described hereinbefore is provided.

In the electric valve of the present solution, the first guide inner wall 201A and the first guide outer wall 601A, the second guide inner wall 602A and the second guide outer wall 502A are provided, the valve closing reliability is improved, and the operation reliability of the valve needle component is improved by the two groups of guide mechanisms. In addition, from the aforementioned operating process of the electric valve from the valve opened state to the third valve closed state, it can be seen that, during the third valve opened state, since there is axial relative movement between the movable connecting component 6A and the valve core sleeve 2A and between the movable connecting component 6A and the valve needle component 5A, a frictional force is generated between the first guide inner wall 201A and the first guide outer wall 601A and also between the second guide inner wall 602A and the second guide outer wall 502A. These frictional forces become the resistance against valve opening during the valve opening process, and may cause the valve to be jammed when the valve is opened. In order to reduce the valve opening resistance, the elastic member 7A is arranged outside the valve needle component 5A, one end of the elastic member abuts against the movable connecting component, and the other end of the elastic member abuts against the valve needle component 5A. Then, at the very moment when the electric valve is opened (that is, in the process of the valve changing from the second valve closed state to the first valve closed state), the spring force of the elastic member 7A can overcome the aforementioned frictional force, which facilitates valve opening and improves the valve opening reliability. Moreover, in the present embodiment, the elastic member 7A is arranged below the first group of guide mechanisms and the second group of guide mechanisms, which is more helpful to overcome the frictional force between the first guide inner wall 201A and the first guide outer wall 601A and between the second guide inner wall 602A and the second guide outer wall 502A. On this basis, furthermore, since the transmission component suspendingly supports the movable connecting component and the movable connecting component suspendingly supports the valve needle component, at the very moment when the valve needle 51A closes the valve port 21A and the very moment when the valve needle 51A is separated from the valve port 21A, and during the process of the second valve closed state, the frictional force between the valve needle 51A and the valve port 21A is caused only by the self-weights of the valve needle component 5A and the movable connecting component 6A. In this way, even if the electric valve is repeatedly operated, there is very little abrasion at the portion where the valve needle 51A is in contact with the valve port 21A, thereby reducing internal leakage of the electric valve in the valve closed state. During the valve opening process, a similar situation occurs when the valve needle 51A is separated from the valve port 21A. At the very moment when the valve needle 51A and the valve port 21A are being separated from each other, the frictional force between the valve needle 51A and the valve port 21A is caused only by the self-weights of the valve needle component 5A and the movable connecting component 6A, and even if the electric valve is repeatedly operated, there is very little abrasion at the portion where the valve needle 51A is in contact with the valve port 21A, which further improves the valve closing reliability.

Moreover, before the valve is closed, the valve needle component 5A and the transmission component 4A are not affected by the spring force of the elastic member 7A. The valve needle component 5A and the movable connecting component 6A do not rotate together with the transmission component 4A. Almost no frictional force is present between the valve core sleeve 2A and the movable connecting component 6A and between the movable connecting component 6A and the valve needle component 5A, which can further reduce the valve opening resistance and improve the valve opening reliability.

It should be noted that, in the present embodiment, in order to improve the wear resistance between the first guide inner wall 201A and the first guide outer wall 601A and between the second guide inner wall 602A and the second guide outer wall 502A, the valve core sleeve 2A and the connecting body 62A may be made of two different materials respectively, for example, one is made of brass material, and the other is made of stainless steel material. Similarly, the connecting body 62A and the valve needle 51A may be made of two different materials respectively, for example, one is made of brass material, and the other is made of stainless steel material. Or, the wear resistance can also be achieved by coating on the first guide inner wall 201A and the first guide outer wall 601A and on the second guide inner wall 602A and the second guide outer wall 502A.

A method for manufacturing the electric valve of the present embodiment is described hereinafter, which specifically includes the following steps:

Step A1, preparing the upper valve body 12A, the lower valve body 13A and the valve core sleeve 2A of the valve body component 1A, preparing the rotor 31A, preparing the transmission component 4A, preparing the valve needle component 5A, preparing the movable connecting component 6A, and preparing the nut component 8A;

Step A2, assembling the elastic member 7A, the transmission component 4A, the movable connecting component 6A and the valve needle component 5A to form a first assembly, allowing the transmission component 4A to be suspendingly connected with the movable connecting component 6A and the movable connecting component 6A to be suspendingly connected with the valve needle component 5A, allowing one end of the elastic member 7A to abut against the movable connecting component 6A and the end of the elastic member to abut against the valve needle component 5A, and allowing the movable connecting component 6A to be in sliding clearance fit with the valve needle component 5A through the second guide inner wall 602A and the second guide outer wall 502A. Step A2 further includes:

Step A21, sleeving the elastic member 7A on the periphery of the valve needle 51A, such that the lower end of the elastic member 7A abuts against the first stepped portion 514A of the valve needle 51A, sleeving the gasket 53A and the lower member 64A on the periphery portion of the valve needle 51A and arranging the two above the elastic member 7A, such that an upper end of the elastic member 7A directly abuts against the gasket 53A and indirectly abuts against the lower member 64A. Then, clamping the lower clamping member 52A in the annular groove 5111A of the main body portion 511A of the valve needle 51A, such that the upper end surface of the lower clamping member abuts against the upper end surface of the annular groove 5111A, and the lower end of the lower clamping member abuts against the upper end surface of the lower member 64A. That is, in this step, under the action of the elastic force of the elastic member 7A and the clamping of the lower clamping member 52A, the valve needle 51A, the elastic member 7A, the gasket 53A, the lower member 64A and the lower clamping member 52A are assembled to form a first sub-assembly. In the first sub-assembly, one end of the elastic member 7A abuts against the lower member 64A, and the other end of the elastic member 7A abuts against the valve needle 51A. In this step, the assembly order among the parts is not limited, as long as the first sub-assembly can be assembled.

Sleeving the upper clamping member 42A on the lower end portion of the transmission shaft 41A and fixing the upper clamping member to the lower end portion of the transmission shaft 41A by welding, and then sleeving the upper member 63A on the periphery portion of the transmission shaft 41A, to form a second sub-assembly. In this step, the upper member 63A may be sleeved on the periphery portion of the transmission shaft 41A first, and then the upper clamping member 41A is sleeved on the lower end portion of the transmission shaft 41A and fixed to the lower end portion of the transmission shaft 41A by welding.

Step A22, respectively press-fitting the upper member 63A and the lower member 64A to the upper opening portion and the lower opening portion of the connecting body 62A to serve as the first assembly, allowing the second guide inner wall 602A of the connecting body 62A to be in sliding clearance fit with the second guide outer wall 502A of the guide portion 513A of the valve needle 51A in the first assembly, and allowing the first radial protrusion of the transmission shaft 41A to suspendingly support the first suspension portion of the movable connecting component 6A, and the second radial protrusion of the movable connecting component 6A to suspendingly support the second suspension portion of the lower clamping member 52A. That is, the transmission component 4A suspendingly supports the movable connecting component 6A, and the movable connecting component 6A suspendingly supports the valve needle component 5A. One end of the elastic member 7A abuts against the lower member 64A, and the other end of the elastic member 7A abuts against the valve needle 51A. Further, in order to ensure the assembling strength between the upper member 63A and the connecting body 62A and between the lower member 64A and the connecting body 62A, the upper member 63A and the lower member 64A may further be fixed to the connecting body 62A by welding, after the upper member 63A and the lower member 64A are respectively press-fitted to the upper opening portion and the lower opening portion of the connecting body 62A.

Step A3, fixing the lower valve body 13A with the valve core sleeve 2A by furnace brazing to form a second assembly. Apparently, it is conceivable that, the above parts may be connected by other welding methods in this step. In this step, the lower valve body 13A, the valve core sleeve 2A, the first connecting tube and the second connecting tube may be simultaneously fixed by furnace brazing to form the second assembly, so as to save a manufacturing cost. That is, the valve core sleeve 2A is arranged in the lower valve body 13A and the lower end portion of the valve core sleeve 2A extends out of the lower valve body 13A, the second connecting tube is welded to a periphery of the lower end portion of the valve core sleeve 2A, and the first connecting tube is welded to the lower valve body 13A.

Step A4, assembling the first assembly with the second assembly. Specifically, the valve needle component 5A of the first assembly is inserted into the valve core sleeve 2A from a lower end, such that the first guide inner wall 201A of the inner wall of the valve core sleeve 2A is in sliding clearance fit with the first guide outer wall 601A of the outer wall of the connecting body 62A.

Step A5, sleeving the nut component 8A on the periphery of the transmission shaft 41A and threadedly connecting the nut component 8A with the transmission shaft 41A, fixing the nut component 8A to the lower valve body 13A by welding, and fixing the rotor 31A to the transmission shaft 41A by welding.

Step A6, fixing the upper valve body 12A to the lower valve body 13A by welding, to complete the manufacture of the electric valve in the present embodiment.

It should be noted that, when the transmission component 4A adopts the integral structure shown in the second embodiment hereinafter, the assembling between the transmission component and the upper member can be understood with reference to the following and will not be repeated herein.

It should be noted that, whether step A2 is performed before or after step A3 is applicable.

Second Embodiment

Figure 9:
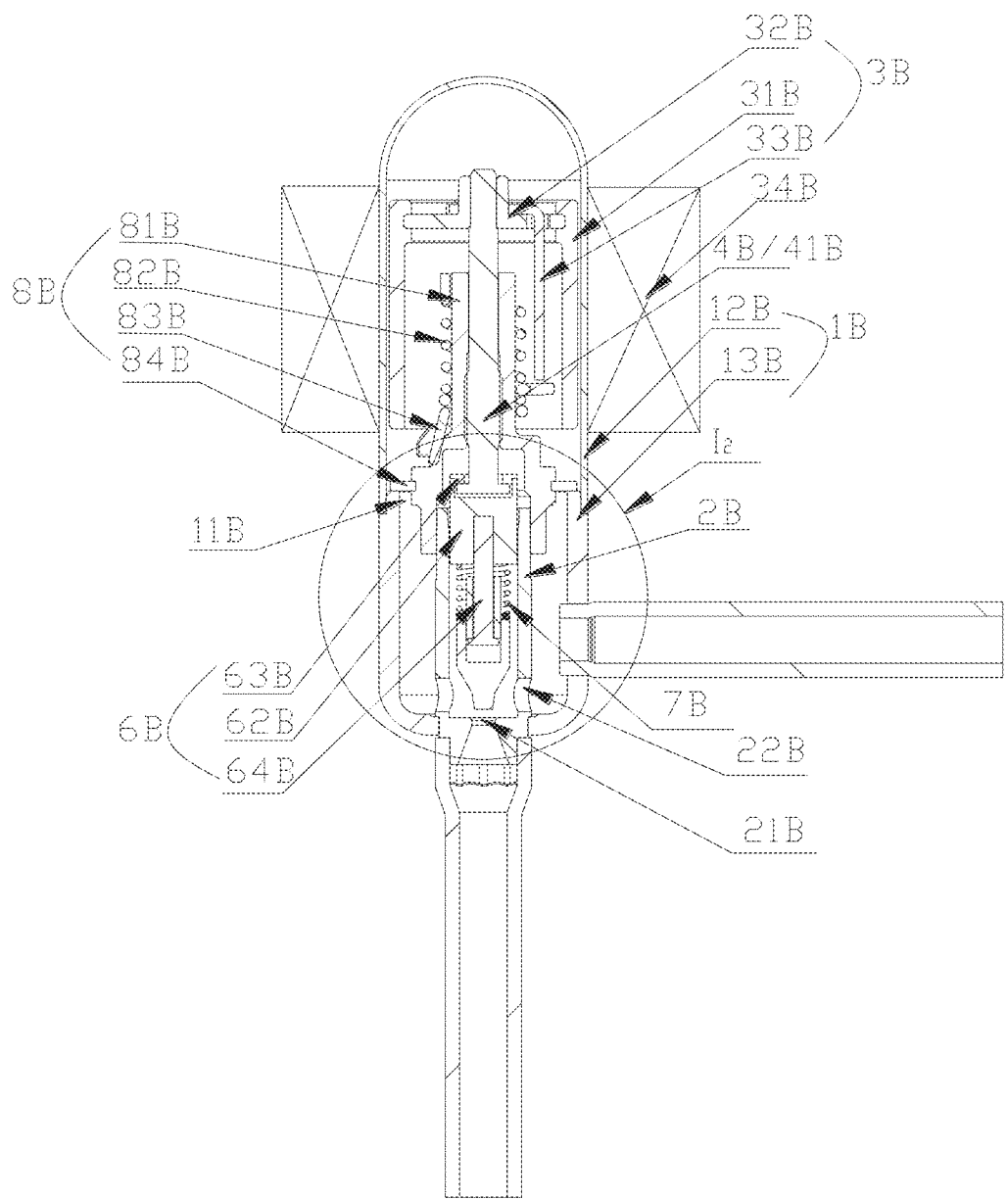
FIG. 9 is a schematic sectional view showing an electric valve according to a second embodiment of the present application, in which the valve is in a fully valve opened state.
Figure 10:
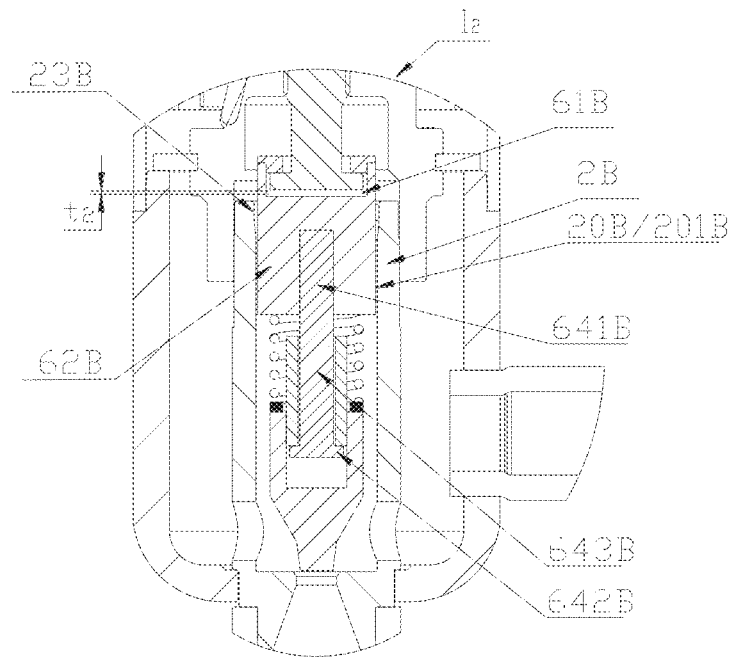
FIG. 10 is a partially enlarged view of a portion I2 in FIG. 9.
Figure 12:
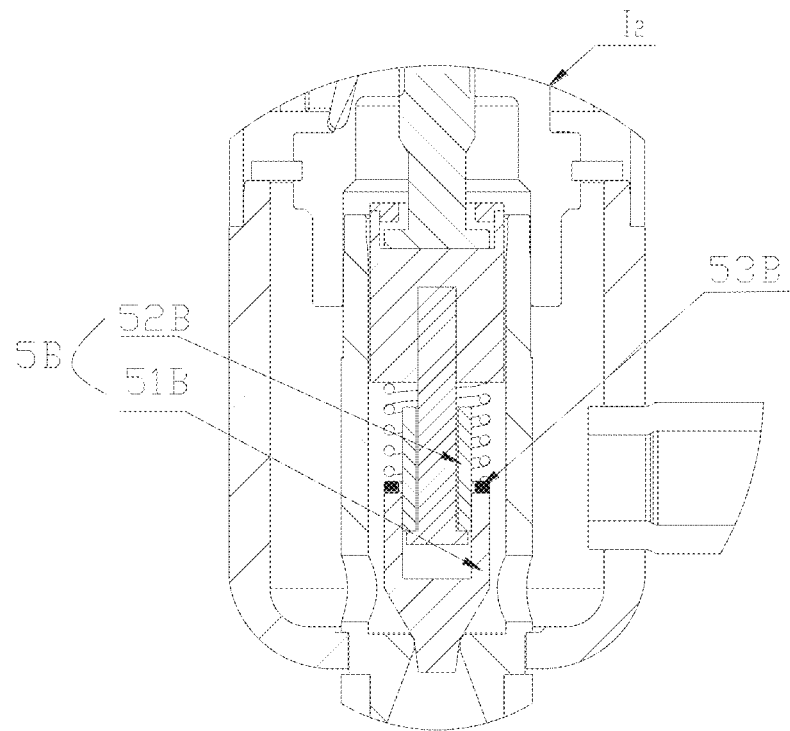
FIG. 12 is a partial enlarged view of the portion I2 in a case that the electric valve in FIG. 9 is in the second valve closed state.
Figure 13:
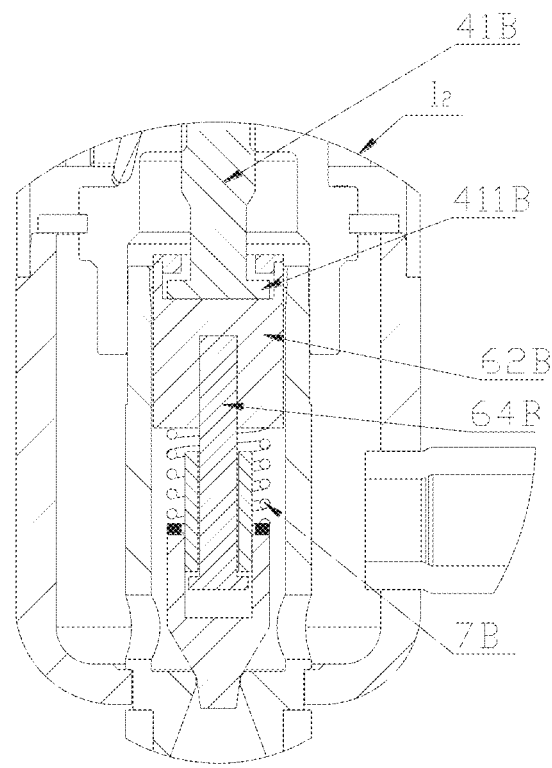
FIG. 13 is a partially enlarged view of the portion I2 in a case that the electric valve in FIG. 9 is in the third valve closed state.
Figure 14:
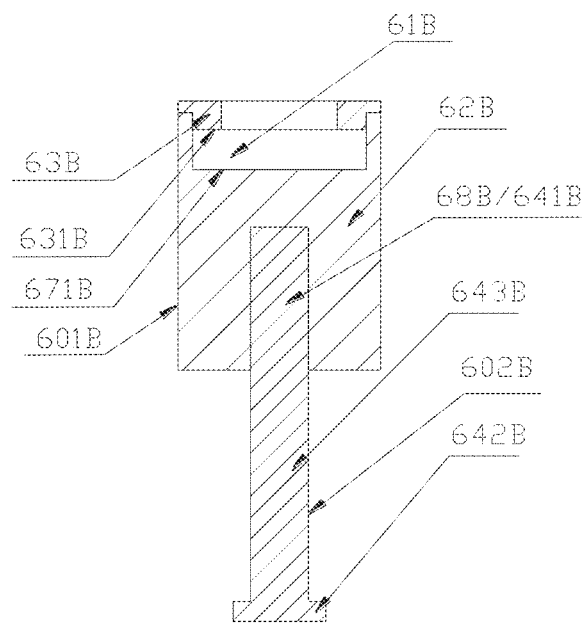
FIG. 14 is a schematic structural view of the movable connecting component in FIG. 9.
Figure 15:
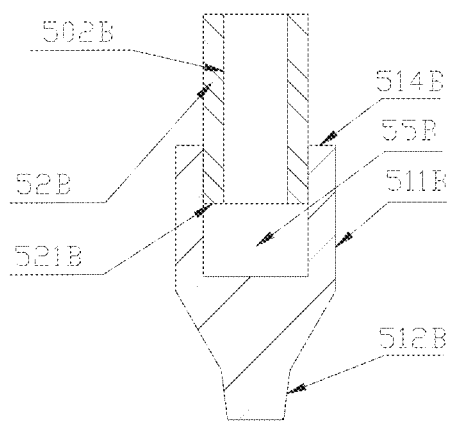
FIG. 15 is a schematic structural view of the valve needle component in FIG. 9.

FIG. 9 is a schematic sectional view showing an electric valve according to a second embodiment of the present application, in which the valve is in a fully valve opened state, FIG. 10 is a partially enlarged view of a portion I2 in FIG. 9, FIG. 11 is a partially enlarged view of the portion I2 in a case that the electric valve in FIG. 9 is in the first valve closed state, FIG. 12 is a partially enlarged view of the portion I2 in a case that the electric valve in FIG. 9 is in the second valve closed state, FIG. 13 is a partially enlarged view of the portion I2 in a case that the electric valve in FIG. 9 is in the third valve closed state, and FIG. 14 is a schematic structural view of the movable connecting component in FIG. 9. FIG. 15 is a schematic structural view of the valve needle component in FIG. 9, FIG. 16 is a first schematic view showing operational characteristics of the electric valve according to the present application, t represents t2 in the present embodiment, and FIG. 17 is a second schematic view showing operational characteristics of the electric valve according to the present application. In the following description of the present embodiment, a state shown in FIG. 10 in which the valve is fully opened is defined as a "valve opened state", and in this case, a transmission component 4B and a movable connecting component 6B are able to move with respect to each other in an axial direction by a distance denoted as t2, that is, a predetermined displacement amount in the present embodiment. A state that a valve needle component 5B closes a valve port 21B and the transmission component 4B and the movable connecting component 6B are still able to move with respect to each other in the axial direction by the distance t2 is defined as the "first valve closed state", as shown in FIG. 11. A state during a period from the "first valve closed state" shown in FIG. 11 to when an axial displacement amount of the transmission component 4B moving in the valve closing direction is less than or equal to the predetermined displacement amount t2 is defined as the "second valve closed state", and FIG. 12 is a schematic structural view when the transmission component moves from the first valve closed state by the axial displacement amount equal to t2. A state that the axial displacement amount of the transmission component 4B moving from the "first valve closed state" in the valve closing direction is greater than the predetermined displacement amount t2 is defined as the "third valve closed state", as shown in FIG. 13.

As shown in FIGS. 9 and 10, the electric valve includes a valve body component 1B having a valve chamber 11B, a drive component 3B, a transmission component 4B, a valve needle component 5B, a movable connecting component 6B, an elastic member 7B, and a nut component 8B. The valve body component 1B includes an upper valve body 12B, a lower valve body 13B, and a valve core sleeve 2B, a first connecting tube is connected to the lower valve body 13B, and the upper valve body 12B is fixed to the lower valve body 13B by welding to form the valve chamber 11B. The valve core sleeve 2B and the lower valve body 13B are two separate components which are fixed to each other by welding. It is conceivable that the valve core sleeve 2B may be integrated with the lower valve body 13B, that is, the two are processed into one part. The valve core sleeve 2B is provided with a valve port 21B which is substantially arranged in the valve chamber 11B, a lower end portion of the valve core sleeve 2B extends out of the valve chamber 11B and is connected with a second connecting tube, that is, in the present embodiment, the valve core sleeve 2B is partially arranged in the valve chamber 11B. The valve core sleeve 2A is a structure which is substantially through in an axial direction. The movable connecting component 6B is at least partially arranged in the valve core sleeve 2B and is able to be in sliding clearance fit with the valve core sleeve 2B. The movable connecting component 6B is suspendingly connected with the transmission component 4B, and the movable connecting component 6B is able to be driven by the transmission component 4B to axially move with respect to the valve core sleeve 2B. An end of the movable connecting component 6B extends into the valve needle component 5B, and the movable connecting component 6B supports the valve needle component 5B. The movable connecting component 6B is suspendingly connected with the valve needle component 5B, and the valve needle component 5B is able to be driven by the movable connecting component 6B to axially move with respect to the valve core sleeve 2B. The elastic member 7B is sleeved on an outer periphery portion of the valve needle component 5B, one end of the elastic member 7B abuts against the movable connecting component 6B, and the other end abuts against the valve needle components 5B.

The nut component 8B includes a nut 81B having an internally threaded hole, a spring guide rail 82B fixed to a periphery portion of the nut 81B, and a slip ring 83B. The slip ring 83B is able to slip axially along the spring guide rail 82B. The nut 81B is fixedly connected to an upper end portion of the lower valve body 13B through a connecting piece 84B. The nut component 8B is sleeved on an outer periphery of the transmission component 4B and is in threaded transmission connection with the transmission component 4B. The drive component 3B includes an electromagnetic coil 34B, a rotor 31B, a connecting seat 32B fixedly connected to the rotor 31B, and a stop rod 33B fixedly connected to the connecting seat 32B. The electromagnetic coil 3B is fixedly connected to the valve body component 1B by a connecting bracket (not shown). The rotor 31B of the drive component 3B is arranged on the outer periphery of the nut component 8B, the rotor 31B is fixedly connected with the transmission component 4B, and coordinates with the electromagnetic coil 34B to drive the transmission component 4B to move in the axial direction of the valve body component 1B. In a case that the rotor component 3B drives the transmission component 4B to reciprocate in the axial direction of the valve body component 1B, the valve needle component 5B and the movable connecting component 6B can correspondingly move to regulate an opening degree of the valve port 21B of the electric valve.

In order to allow the valve needle component 5B to be accurately aligned with the valve port 21B and improve the valve closing reliability, in the electric valve of the present embodiment, the valve core sleeve 2B includes a first guide inner wall, and the movable connecting component 6B includes a first guide outer wall in sliding clearance fit with the first guide inner wall. The movable connecting component 6B further includes a second guide outer wall, and the valve needle component 5B includes a second guide inner wall in sliding clearance fit with the second guide outer wall. It is defined that, the first guide inner wall and the first guide outer wall form a first group of guide mechanisms, and the second guide inner wall and the second guide outer wall form a second group of guide mechanisms.

Specifically, as shown in FIGS. 10, 11, 15 and 16, the valve core sleeve 2B is a structure having a first central through hole and a cylindrical inner wall. The movable connecting component 6B is arranged in the first central through hole. An inner wall of the first central through hole includes a first guide inner wall 201B. An upper end of the movable connecting component 6B extends out of the valve core sleeve 2B, that is, the movable connecting component 6B is partially arranged in the valve core sleeve 2B. An outer wall of the movable connecting component 6B includes a first guide outer wall 601B in sliding clearance fit with the first guide inner wall 201B. The valve core sleeve 2B is in guiding fit with the movable connecting component 6B through the first guide inner wall 201B and the first guide outer wall 601B, that is, the movable connecting component 6B is guided by the first guide inner wall 201B of the valve core sleeve 2B.

An outer wall of the movable connecting component 6B further includes a second guide outer wall 602B, and a second guide inner wall 502B in sliding clearance fit with the second guide outer wall 602B is provided on an inner wall the valve needle component 5B. The movable connecting component 6B is in guiding fit with the valve needle component 5B through the second guide outer wall 602B and the second guide inner wall 502B. The valve needle component 5B is guided by the second guide outer wall 602B of the movable connecting component 6B.

In the electric valve, the valve core sleeve 2B guides the movable connecting component 6B by the guiding fit between the first guide inner wall 201B and the first guide outer wall 601B, and the movable connecting component 6B guides the valve needle component 5B by the cooperation between the second guide inner wall 502B and the second guide outer wall 602B. In this way, the valve needle component 5B is more accurately aligned with the valve port 21B by the arrangement of the two groups of guide mechanisms, and the valve closing reliability is improved.

Further, since a frictional force is generated between the first guide inner wall 201B and the first guide outer wall 601B and also between the second guide outer wall 602B and the second guide inner wall 502B at a final stage of valve closing (that is, in the process of the valve changing from the second valve closed state to the third valve closed state described above), the valve opening is adversely affected by the frictional force. Therefore, in order to improve the valve opening reliability, the electric valve of the present embodiment further includes the elastic member 7B, and the elastic member 7B is sleeved outside the valve needle component 5B, one end of the elastic member 7B abuts against the movable connecting component 6B, and the other end abuts against the valve needle component 5B. In this way, at the very moment when the electric valve is opened (that is, in the process of the valve changing from the third valve closed state to the second valve closed state), the elastic force of the elastic member 7B generates an upward thrust effect on the movable connecting component 6B, which is helpful to overcome the aforementioned frictional force, allows the movable connecting component 6B to move upward more easily, and avoids the valve jam caused by the friction when the valve is opened. It is easier to open the valve, the operation of the valve needle component is stable, the abrasion of a contact portion between the valve needle component 5B and the valve port 21B is reduced, an internal leakage rate of the electric valve is reduced, and the sealing performance of the valve is improved.

Further, the transmission component 4B includes a first radial protrusion, and the movable connecting component 6B includes a first suspension portion. The first radial protrusion suspendingly supports the first suspension portion, and the first radial protrusion is able to abut against or be separated from the first suspension portion, so that the transmission component 4B suspendingly supports the movable connecting component 6B, that is, the transmission component 4B is suspendingly connected with the movable connecting component 6B. The movable connecting component 6B further includes a second radial protrusion, and the valve needle component 5B includes a second suspension portion. The second radial protrusion suspendingly supports the second suspension portion, and the second radial protrusion is able to abut against or be separated from the second suspension portion, so that the movable connecting component 6B suspendingly supports the valve needle component 5B, that is, the movable connecting component 6B is suspendingly connected with the valve needle component 5B. The movable connecting component 6B includes a stop portion arranged below the first radial protrusion, and when the transmission component 4B moves in the valve closing direction, the first radial protrusion is able to abut against the stop portion. Specifically, when the transmission component 4B moves to a position where the first radial protrusion abuts against the first suspension portion and the second radial protrusion abuts against the second suspension portion, the transmission component 4B can drive the movable connecting component 6B to move upward in the axial direction, and the movable connecting component 6B can drive the valve needle component 5B to move upward in the axial direction.

When the transmission component 4B moves in the valve closing direction from the valve opened state, as the transmission component 4B moves downward, the movable connecting component 6B and the valve needle component 4B move downward with the transmission component 4B due to the action of their own gravities, that is, the three components move together until the valve reaches the first valve closed state in which the valve port 21B is closed by the valve needle component 5B. During a time period from when the valve needle component 5B closes the valve port 21B to when the transmission component 4B moves toward the valve closing direction by a predetermined displacement amount t2, the elastic member 7B does not generate an elastic force for pushing the valve needle component 5B toward the valve port 21A; and during a time period from when the valve needle component 5B closes the valve port 21B to when the transmission component 4B moves in the valve closing direction by a displacement amount greater than the predetermined displacement amount t2, that is, after the transmission component 4B moves in the valve closing direction to a position where the first radial protrusion abuts against the stop portion, the transmission component 4B pushes the movable connecting component 6B to move in the valve closing direction, and the elastic member 7B pushes the valve needle component 5B toward the valve port 21B.

Thus, during the time period from when the valve needle component 5B closes the valve port 21B to when the transmission component 4B moves in the valve closing direction by a displacement amount no greater than the predetermined displacement amount t2 and at the very moment when the electric valve is opened, a frictional force generated between the valve needle component 5B and the valve port 21B is caused by the gravity of the valve needle component 5B, and an abrasion loss of a contact surface between the valve needle component 5B and the valve port 21B is extremely small, thereby reducing the internal leakage of the electric valve, which can also avoid leakage of the valve port in a fully closed state even if the electric valve operates repeatedly, and thereby ensuring the sealing performance of the valve.

Moreover, before the valve is closed, the valve needle component 5B and the transmission component 4B are not affected by the spring force of the elastic member 7B. The valve needle component 5B and the movable connecting component 6B do not rotate together with the transmission component 4B. Almost no frictional force is present between the valve core sleeve 2B and the movable connecting component 6B and between the movable connecting component 6B and the valve needle component 5B, which can further reduce the valve opening resistance.

The working principle of the electric valve of the present embodiment is as follows:

Specifically, during a process that the transmission component 4B moves in the valve closing direction from the valve opened state shown in FIG. 10 to a state that the valve needle component 5B closes the valve port 21B, that is, the first valve closed state shown in FIG. 11, the movable connecting component 6B and the valve needle component 5B move together with the transmission component 4B under the action of their own gravities, and the first guide inner wall 201B moves axially relative to the first guide outer wall 601B and is in guiding fit with the first guide outer wall 601B. At this time, although abrasion is present between the first guide inner wall 201B and the first guide outer wall 601B, the frictional force is only generated by the gravity of the movable connecting component 6B itself, and a degree of the abrasion is extremely small. Moreover, the elastic member 7B does not generate the elastic force for pushing the valve needle component 5A toward the valve port 21A.

Then, during the second valve closed state, that is, during a process from the state shown in FIG. 11 to the state shown in FIG. 12, the transmission component 4B moves downward, that is, the transmission component 4B moves axially, with respect to the movable connecting component 6B, in the valve closing direction within the predetermined displacement amount 2. During the downward movement of the transmission component 4B, positions of the movable connecting component 6B and the valve needle component 5B are kept unchanged, the first guide inner wall 201B is in guiding fit with the first guide outer wall 601B and the second guide outer wall 602B is in guiding fit with the second guide inner wall 502B, and no relative displacement and no frictional force is generated therebetween. Moreover, the elastic member 7B does not generate the spring force for pushing the valve needle component 5B toward the valve port 21B, and there is no abrasion for the contact portion between the valve needle component 5B and the valve port 21B.

Then, during the third valve closed state, that is, during a process that the transmission shaft component 4B continues to move in the valve closing direction from the state shown in FIG. 12 to the state shown in FIG. 13, the transmission component 4B pushes the movable connecting component 6B, and the movable connecting component 6B pushes the elastic member 7B, to move together in the valve closing direction. During the process, the movable connecting component 6B moves downward with respect to the valve core sleeve 2B, the movable connecting component 6B is in guiding fit with the valve core sleeve 2B through the first guide inner wall 201B and the first guide outer wall 601B, abrasion occurs between the first guide inner wall 201B and the first guide outer wall 601B, and a frictional force is generated therebetween. At the same time, the movable connecting component 6B moves downward with respect to the valve needle component 5B, the movable connecting component 6B is in guiding fit with the valve needle component 5B through the second guide outer wall 602B and the second guide inner wall 502B, abrasion occurs between the second guide outer wall 602B and the second guide inner wall 502B, and a frictional force is generated therebetween. Moreover, during this process, the elastic member 7B is deformed under pressure to generate the spring force for pushing the valve needle component 5B toward the valve port 21B, further improving the valve closing reliability and improving the sealing performance when the valve is closed.

During the valve opening process, when the electric valve changes from the state shown in FIG. 13 to the state shown in FIG. 12, that is, during a process that the electric valve changes from the third valve closed state to the second valve closed state shown in FIG. 12, the movable connecting component 6B is pushed upward by the spring force of the elastic member 7B, thereby easily overcoming the frictional force generated during the third valve closed state of valve closing and avoiding the valve jam caused by the friction when the valve is opened. In the process from the second valve closed state to the state that the valve is fully opened shown in FIG. 10, almost no frictional force is present between the first guide inner wall 201B and the first guide outer wall 601B and between the second guide outer wall 602B and the second guide inner wall 502B, so the valve is not jammed during this valve opening process, and the valve can be opened freely.

In the whole process, the valve core sleeve 2B guides the movable connecting component 6B by the cooperation between the first guide inner wall 201B and the first guide outer wall 601B, and the movable connecting component 6B guides the valve needle component 5B by the cooperation between the second guide inner wall 502B and the second guide outer wall 602B, so that the valve closing reliability and the valve opening reliability are improved, and the sealing performance when the valve is closed is also improved.

It can be seen from the above that the electric valve of the present embodiment has the following advantages:

On the one hand, by the cooperation between the first guide inner wall 201B and the first guide outer wall 601B and the guide cooperation between the second guide outer wall 602B and the second guide inner wall 502B, the valve needle component 5B is more accurately aligned with the valve port 21B during the movement process, the valve closing reliability is improved, and the operation of the valve needle component is stable.

On the other hand, since frictional force is generated between the first guide inner wall 201B and the first guide outer wall 601B and between the second guide outer wall 602B and the second guide inner wall 502B during the third valve closed state of valve closing, the frictional force adversely affects the valve opening operation performance. To this end, in the present embodiment, the elastic member 7B is arranged outside the movable connecting component 6B, one end of the elastic member abuts against the movable connecting component 6B, and the other end of the elastic member abuts against the valve needle component 5B. Then, during the valve opening process, the movable connecting component 6B is pushed upward by the spring force of the elastic member 7B, which is helpful to overcome the aforementioned frictional force, avoids the valve jam caused by the friction when the valve is opened, and improves the valve opening reliability.

Furthermore, the transmission component 4B is suspendingly connected with the movable connecting component 6B, and the movable connecting component 6B is suspendingly connected with the valve needle component 5B. During a time period from when the valve needle component 5B closes the valve port 21B to when the transmission component 4B moves in the valve closing direction by the predetermined displacement amount t2, the elastic member 7B does not generate the spring force for pushing the valve needle component 5B toward the valve port 21B. During a time period from when the valve needle component 5B closes the valve port 21B to when the transmission component 4B moves in the valve closing direction by a displacement amount greater than the predetermined displacement amount t2, the elastic member 7B generates the spring force for pushing the valve needle component 5B toward the valve port 21B. In this way, abrasion for the contact portion between the valve needle component 5B and the valve port 21B only occurs during the third valve closed state, and there is no abrasion for the contact portion between the valve needle component 5B and the valve port 21B in the process of the valve changing from the valve opened state to the first valve closed state and in the process of the valve changing from the first valve closed state to the second valve closed state, thereby further reducing the internal leakage between the valve needle component 5B and the valve port 21B. Moreover, during the valve opening process, a similar situation occurs when the valve needle 51B is separated from the valve port 21B. At the very moment when the valve needle 51B and the valve port 21B are being separated from each other, the frictional force between the valve needle 51B and the valve port 21B is caused only by the self-weights of the valve needle component 5B and the movable connecting component 6B, and even if the electric valve is repeatedly operated, there is very little abrasion at the contact portion between the valve needle 51B and the valve port 21B, thereby improving the sealing performance of the valve.

Specific structural designs of the components such as the transmission component 4B, the valve needle component 5B and the movable connecting component 6B in the present embodiment are described in detail hereinafter.

As shown in FIGS. 9 to 11 and FIG. 14, the movable connecting component 6B includes a connecting body 62B, and an upper end portion of the connecting body 62B has an upper opening portion 67B, and the bottom 671B of the upper opening portion 67B forms the stop portion in the present embodiment. A lower end portion of the connecting body 62B further has a blind hole-like lower inserting hole 68B, the connecting body 62B has a cylindrical outer wall and includes the first guide outer wall 601B which can be in sliding clearance fit with the first guide inner wall 201B of the valve core sleeve 2B.

The movable connecting component 6B further includes an upper member 63B fixed to the upper opening portion 67B and a substantially rod-shaped lower member 64B of which one end is inserted into the lower inserting hole 68B and fixedly connected to the connecting body 68B. The upper member 63B is specifically a first annular member having an axial through hole, and the upper member 63B is sleeved on a periphery of the transmission component 4B and is fixed to the upper opening portion of the connecting body 62B by welding. The upper member 63B is fixedly connected to the connecting body 62B to form an accommodating hole 61B. The upper member 63B includes a first annular portion 631B having a through hole, which serves as the first suspension portion of the present embodiment.

When the upper member 63B is fixed to the upper opening portion of the connecting body 62B by welding, in order to avoid the welding position and nearby portions from adversely affecting on the guide effect between the first guide inner wall 201B and the first guide outer wall 601B after the upper member 63B is welded to the upper opening portion 67B, a first small-diameter portion 20B is provided on an inner wall of the valve core sleeve 2B, the first small-diameter portion 20B includes the first guide inner wall 201B, and a first diameter-expanded portion 23B with a diameter greater than that of the first small-diameter portion 20B is provided above the first small-diameter portion 20B; or, the outer wall of the connecting body 62B includes a first large-diameter portion 624B and a first diameter-reduced portion 625B arranged above the first large-diameter portion 624B, the first large-diameter portion 624B includes the first guide outer wall 601B, and the first diameter-reduced portion 625B is fixed to the upper member 63B by welding; or, a first small-diameter portion 20B is provided on the inner wall of the valve core sleeve 2B, the first small-diameter portion 20B includes the first guide inner wall 201B, a first diameter-expanded portion 23B with a diameter greater than that of the first small-diameter portion 20B is provided above the first small-diameter portion 20B, and, the outer wall of the connecting body 62B includes a first large-diameter portion 624B and a first diameter-reduced portion 625B arranged above the first large-diameter portion 624B, the first large-diameter portion 624B includes the first guide outer wall 601B, and the first diameter-reduced portion 625B is fixed to the upper member 63B by welding.

The upper end of the lower member 64B is fixedly connected to the connecting body 62B by press-fitting, or welding, or the combination of press-fitting and welding. The lower member 64B includes an extending portion 641B inserting into the lower inserting hole 68B, a second radial protrusion 642B radially extending along a lower end portion of the lower member 64B, and a base portion 643B connecting with the extending portion 641B and the first radial protrusion 642B. The second guide outer wall 602B of the present embodiment is arranged on an outer wall of the base portion 643B. The "connection" herein includes that the lower member is a split structure and the separate members of the split structure are fixedly connected by welding, and also includes that the lower member is an integral structure.

As shown in FIGS. 9 and 11, the transmission component 4B includes the transmission shaft 41B, a lower end portion of the transmission shaft 41B is located in the accommodating hole 61B and extends in the radial direction to form an annular protrusion 411B which forms the first radial protrusion in the present embodiment. An upper end surface portion of the first radial protrusion is able to abut against or be separated from a lower end surface portion of the suspension portion 631B, and a lower end surface portion of the first radial protrusion is able to abut against or be separated from a stop portion 671B. After the transmission shaft 41B moves in the valve closing direction to a position where the first radial protrusion abuts against the stop portion 671B, the transmission shaft 41B is able to push the connecting body 62B to move in the valve closing direction, and the connecting body 62B pushes the elastic member 7B to allow the elastic member 7B to generate the spring force for pushing the valve needle component 5B toward the valve port 21B. Apparently, it should be understood that, the transmission component 4B in the present embodiment may be configured to have a same split structure as the transmission component in the first embodiment.

The first radial protrusion 411B of the transmission component 4B is able to move axially within the accommodating hole 61B. In a case that the electric valve is in the valve opened state or the first valve closed state, the first suspension portion 631B of the upper member 63B abuts against the first radial protrusion 411B of the transmission shaft 41B, and the transmission shaft 41B suspendingly supports the movable connecting component 6B. In this case, an axial distance between the first radial protrusion 411B and the stop portion 671B is the predetermined displacement amount t2 described in the present embodiment, and the predetermined displacement amount t2 may be determined according to actual needs. In practical arrangement, a predetermined radial displacement amount may be provided between the transmission shaft 41B and the connecting body 62B, and between an upper clamping member 42B and the connecting body 62B respectively, so that center alignment of the transmission shaft 41B can be performed self-adaptively.

As shown in FIGS. 12 to 15, the valve needle component 5B includes a valve needle 51B and a lower clamping member 52B fixedly connected with the valve needle 51B, and the valve needle 51B specifically includes a main body portion 511B having an opened chamber with an upper opening, a flow regulating portion 512B arranged below the main body portion 511B and may be in contact with or separated from the valve port 21B. The lower clamping member 52B is fixedly connected to the main body portion 511B to form a first connecting chamber 55B. The second guide inner wall 502B is provided on an inner wall of the lower clamping member 52B. A lower end portion 521B of the lower clamping member 52B forms the second suspension portion. The main body portion 511B and the lower clamping member 52B together form a first stepped portion 514B. The first stepped portion 514B is provided with a gasket 53B. The lower clamping member 52B is a structure which is substantially through in the axial direction. The lower clamping member 52B is sleeved on a periphery of the base portion 643B of the lower member 64B, and the elastic member 7B is sleeved on a periphery portion of the lower clamping member 52B. One end of the elastic member 7B abuts against the lower end surface portion of the connecting body 62B, and the other end of the elastic member 7B indirectly abuts against the main body portion 511B after directly abutting against the gasket 53B. Herein, it is conceivable that, the gasket 53B may be arranged between the end of the elastic member 7B for abutting against the connecting body 62B and the lower end surface portion of the connecting body 62B, or gaskets 53B may be respectively arranged between the end of the elastic member 7B for abutting against the connecting body 62B and the lower end surface portion of the connecting body 62B and arranged on the first stepped portion 514B. The function of the gasket 53B is to reduce the frictional force between the elastic member 7B and the lower member 64B or between the elastic member 7B and the valve needle 51B, thereby reducing the frictional force between the valve needle component 5B and the transmission component 4B, preventing the valve needle 51B from rotating with the transmission component 4B, and reducing the abrasion of the contact portion between the valve needle 51B and the valve port 21B.

Specific structures of the transmission component 4B, the valve needle component 5B and the movable connecting component 6B in the present embodiment have been described in detail hereinbefore. Operations of the electric valve in the present embodiment from the valve opened state shown in FIG. 10 to the valve tightly closed state shown in FIG. 13 will be described in detail hereinafter in conjunction with FIGS. 16 and 17. As for the present embodiment, t represents t2 in FIG. 16. FIG. 17 is a second schematic view showing operational characteristics of the electric valve according to the present application, which shows a relationship between the number of pulses of the electromagnetic coil and the frictional forces of the first group of guide mechanisms and the second group of guide mechanisms.

An operating process of the valve from the valve opened state shown in FIG. 10 to the first valve closed state shown in FIG. 11 is as follows.

As shown in FIGS. 9 and 10, the electric valve is in the valve opened state in which the valve needle 51B is separated from the valve port 21B. In the valve opened state, the first radial protrusion 411B of the transmission component 4B abuts against the first annular portion 631B of the upper member 63B of the movable connecting component 6B, such that the transmission component 4B suspendingly supports the movable connecting component 6B. The radial predetermined displacement amount t2 is provided between the lower end surface portion of the first radial protrusion 411B and the stop portion 671B of the connection body 62B.

A lower end surface portion 521B of the lower clamping member 52B of the valve needle component 5B abuts against an upper end surface portion of the first radial protrusion 642B of the lower member 64B of the movable connecting component 6B, so that the movable connecting component 6B suspendingly supports the valve needle component 5B.

Starting from the valve opened state, the drive component 3B of the electric valve drives the transmission component 4B to move in the valve closing direction until the flow regulating portion 512B of the valve needle 51B comes into contact with the valve port 21B to close the valve port 21B, that is, until reaching the first valve closed state shown in FIG. 12. In the above process, the transmission component 4B, the movable connecting component 6B, the elastic member 7B and the valve needle component 5B together may be seen as an integral body moving axially in the valve closing direction, a relationship among relative positions of the transmission component 4B, the movable connecting component 6B, the valve needle component 5B, and the elastic member 7B is the same as that in the valve opened state shown in FIG. 10, and the four members move downward together with respect to the valve core sleeve 2B.

In the above process, on the one hand, since the movable connecting component 6B does not move axially with respect to the valve needle component 5B, there is no abrasion between the second guide outer wall 602B and the second guide inner wall 502B. On the other hand, since the movable connecting component 6B moves axially with respect to the valve core sleeve 2B. At this time, the two realize the guiding fit through the first guide inner wall 201B and the first guide outer wall 601B. Although abrasion is present between the first guide inner wall 201B and the first guide outer wall 601B during the guiding fit process, the frictional force is only generated by the gravity of the movable connecting component 6B itself, and a degree of the abrasion is extremely small. Furthermore, the axial predetermined displacement amount t2 is provided between the lower end surface portion of the first radial protrusion 411B and the stop portion of the movable connecting component 6B, the elastic member 7B is not compressed and does not generate the elastic force for pushing the valve needle component 5B toward the valve port 21B, the valve needle component 5B closes the valve port 21B under the action of its own gravity, the valve needle 51B and the valve port 21B are not affected by the elastic force of the elastic member 7B, and even if the valve needle 51B rotates, the valve port 21B is only subjected to a frictional force caused by self-weights of the valve needle component 5B and the movable connecting component 6B, which brings very little abrasion to a contact surface between the valve needle 51B and the valve port 21B.

An operating process of the valve from the first valve closed state shown in FIG. 11 to the second valve closed state shown in FIG. 12 is as follows.

Starting from the first valve closed state shown in FIG. 11 in which the valve needle 51B closes the valve port 21B, pulses are supplied for closing the valve, the drive component 3B further drives the transmission component 4B to move axially in the valve closing direction, and due to the predetermined displacement amount t2 between the first radial protrusion 411B and the stop portion 671B, a relationship among positions of the movable connecting component 6B, the valve needle component 5B and the valve port 21B does not change. That is, there is no axial relative movement between the valve core sleeve 2B and the movable connecting component 6B and between the movable connecting component 6B and the valve needle component 5B, and only the transmission shaft 41B moves axially downward in the valve closing direction. An end point of the second valve closed state is reached when the transmission shaft 41B moves downward to a position where the first radial protrusion 411B abuts against the stop portion 671B of the connecting body 62B. That is, the second valve closed state is a process in which the displacement amount of the transmission shaft 41B moving in the valve closing direction from the first closed valve state is less than or equal to the predetermined displacement amount t2. FIG. 12 is a view showing the state that the displacement amount of the transmission component 4B is equal to the predetermined displacement amount t2, which is a very moment when the first radial protrusion 411B of the transmission shaft 41B just comes into contact with the stop portion 671B of the connecting body 62B, but does not apply a force to the stop portion 671B.

In the above process, on the one hand, there is no frictional force between the first guide inner wall 201B and the first guide outer wall 601B and between the second guide outer wall 602B and the second guide inner wall 502B; and on the other hand, the elastic member 7B does not generate the spring force for pushing the valve needle component 5B toward the valve port 21B, which means that the contact surface between the valve needle 51B and the valve port 21B is not affected by the spring force of the elastic member 7B. During the entire process of the second valve closed state, even if the valve needle 51B rotates, the valve port 21B is only subjected to the frictional force caused by the self-weights of the valve needle component 5B and the movable connecting component 6B, which brings very little abrasion to the contact surface between the valve needle 51B and the valve port 21B.

An operating process of the valve from the second valve closed state shown in FIG. 12 to the third valve closed state shown in FIG. 13 is as follows.

Starting from the second valve closed state shown in FIG. 12, pulses are supplied for closing the valve, the drive component 3B further drives the transmission shaft 41B to move axially in the valve closing direction. Since the first radial protrusion 411B of the transmission shaft 41B abuts against the stop portion 671B of the connecting body 62B, the movable connecting component 6B is pressed by the transmission shaft 41B to move downward during the downward movement of the transmission shaft 41B, the movable connecting component 6B moves axially with respect to the valve core sleeve 2B, and the movable connecting component 6B moves axially with respect to the valve needle component 5B, such that a frictional force is generated between the first guide inner wall 201B and the first guide outer wall 601B and also between the second guide inner wall 601B and the second guide inner wall 502B. These frictional forces become the resistance against valve opening during the valve opening process. Therefore, the elastic member 7B is arranged outside the movable connecting component 6B, one end of the elastic member abuts against the movable connecting component 6B, and the other end of the elastic member abuts against the valve needle component 5B. Then, at the very moment when the electric valve is opened (that is, in the process of the valve changing from the second valve closed state to the first valve closed state), the spring force of the elastic member 7B can overcome the aforementioned frictional force, which facilitates valve opening and improves the valve opening reliability.

Moreover, in the present embodiment, the elastic member 7B is arranged below the first group of guide mechanisms and the second group of guide mechanisms, which is more helpful to overcome the frictional force between the first guide inner wall 201B and the first guide outer wall 601B and between the second guide outer wall 602B and the second guide inner wall 502B. In addition, during this process, the elastic member 7B is compressed and deformed to generate the elastic force for pushing the valve needle 51B toward the valve port 21B, and the spring force enables the valve needle 51B to seal the valve port 21B more reliably, to tightly close the valve port 21B, and thereby improving the valve closing reliability.

In the process, since the elastic member 7B is compressed, in a case that the frictional force between the valve needle 51B and the transmission shaft 41B is greater than the frictional force between the valve needle 51B and the valve port 21B, the valve needle 51B rotates together with the transmission shaft 41B with respect to the valve port 21B, and there is abrasion at a portion where the valve port 21B is in contact with the valve needle 51B. In a case that the frictional force between the valve needle 51B and the transmission component 4B is smaller than the frictional force between the valve needle 51B and the valve port 21B, the valve needle 51B does not rotate together with the transmission component 4B, then there is very little abrasion at the portion where the valve port 21B is in contact with the valve needle 51B. Therefore, in order to reduce the frictional force between the valve needle 51B and the transmission component 4B, the gasket 53B described hereinbefore is provided.

In the electric valve of the present solution, the first guide inner wall 201B and the first guide outer wall 601B, the second guide inner wall 502B and the second guide outer wall 602B are provided, the valve closing reliability is improved, and the operation reliability of the valve needle component is improved by the two groups of guide mechanisms. In addition, from the aforementioned operating process of the electric valve from the valve opened state to the third valve closed state, it can be seen that, during the third valve opened state, since there is axial relative movement between the movable connecting component 6B and the valve core sleeve 2B and between the movable connecting component 6B and the valve needle component 5B, a frictional force is generated between the first guide inner wall 201B and the first guide outer wall 601B and also between the second guide inner wall 502B and the second guide outer wall 602B. These frictional forces become the resistance against valve opening during the valve opening process, and may cause the valve to be jammed when the valve is opened. In order to reduce the valve opening resistance, the elastic member 7B is arranged outside the movable connecting component 6B, one end of the elastic member abuts against the movable connecting component, and the other end of the elastic member abuts against the valve needle component 5B. Then, at the very moment when the electric valve is opened (that is, in the process of the valve changing from the second valve closed state to the first valve closed state), the spring force of the elastic member 7B can overcome the aforementioned frictional force, which facilitates valve opening and improves the valve opening reliability. Moreover, in the present embodiment, the elastic member 7B is arranged below the first group of guide mechanisms and the second group of guide mechanisms, which is more helpful to overcome the frictional force between the first guide inner wall 201B and the first guide outer wall 601B and between the second guide inner wall 502B and the second guide outer wall 602B. On this basis, furthermore, since the transmission component suspendingly supports the movable connecting component and the movable connecting component suspendingly supports the valve needle component, at the very moment when the valve needle 51B closes the valve port 21B and the very moment when the valve needle 51B is separated from the valve port 21B, and during the process of the second valve closed state, the frictional force between the valve needle 51B and the valve port 21B is caused only by the self-weights of the valve needle component 5B and the movable connecting component 6B. In this way, even if the electric valve is repeatedly operated, there is very little abrasion at the portion where the valve needle 51B is in contact with the valve port 21B, thereby reducing internal leakage of the electric valve in the valve closed state. During the valve opening process, a similar situation occurs when the valve needle 51B is separated from the valve port 21B. At the very moment when the valve needle 51B and the valve port 21B are being separated from each other, the frictional force between the valve needle 51B and the valve port 21B is caused only by the self-weights of the valve needle component 5B and the movable connecting component 6B, and even if the electric valve is repeatedly operated, there is very little abrasion at the portion where the valve needle 51B is in contact with the valve port 21B, which further improves the valve closing reliability.

Moreover, before the valve is closed, the valve needle component 5B and the transmission component 4B are not affected by the spring force of the elastic member 7B. The valve needle component 5B and the movable connecting component 6B do not rotate together with the transmission component 4B. Almost no frictional force is present between the valve core sleeve 2B and the movable connecting component 6B and between the movable connecting component 6B and the valve needle component 5B, which can further reduce the valve opening resistance and improve the valve opening reliability.

It should be noted that, in the present embodiment, in order to improve the wear resistance between the first guide inner wall 201B and the first guide outer wall 601B and between the second guide outer wall 602B and the second guide inner wall 502B, the valve core sleeve 2B and the connecting body 62B may be made of two different materials respectively, for example, one is made of brass material, and the other is made of stainless steel material. Similarly, the lower member 64B and the lower clamping member 52B may be made of two different materials respectively, for example, one is made of brass material, and the other is made of stainless steel material. Or, the wear resistance can also be achieved by coating on the first guide inner wall 201B and the first guide outer wall 601B and on the second guide outer wall 602B and the second guide inner wall 502B.

A method for manufacturing the electric valve of the present embodiment is described hereinafter, which includes the following steps:

Step A1, preparing the upper valve body 12B, the lower valve body 13B and the valve core sleeve 2B of the valve body component 1B, preparing the rotor 31B, preparing the transmission component 4B, preparing the valve needle component 5B, preparing the movable connecting component 6B, and preparing the nut component 8B;

Step A2, assembling the elastic member 7B, the transmission component 4B, the movable connecting component 6B and the valve needle component 5B to form a first assembly, allowing the transmission component 4B to be suspendingly connected with the movable connecting component 6B and the movable connecting component 6B to be suspendingly connected with the valve needle component 5B, allowing one end of the elastic member 7B to abut against the movable connecting component 6B and the end of the elastic member to abut against the valve needle component 5B, and allowing the movable connecting component 6B to be in sliding clearance fit with the valve needle component 5B through the second guide inner wall 502B and the second guide outer wall 602B. Step A2 further includes:

Step A21, sleeving the lower clamping member 52B the periphery portion of the lower member 64B, allowing the second guide inner wall 502B of the inner wall of the lower clamping member 52B to be in sliding clearance fit with the second guide outer wall 602B of the outer wall of the lower member 64B, inserting the lower end portion of the lower clamping member 52B into the opened chamber of the valve needle 51B and fixing the lower clamping member 52B to the valve needle 51B by press-fitting, and allowing the lower member 64B to suspendingly support the valve needle component 5B, wherein in order to ensure the cooperation strength, the lower clamping member 52B may be further welded to the valve needle 51B; sleeving the gasket 53B and the elastic member 7B on the periphery portion of the lower clamping member 52B, and then inserting the upper end of the lower member 64B into the lower inserting hole 68B of the connecting body 62B and fixing the lower member 64B to the connecting body 62B by press-fitting to complete the assembling of a first sub-assembly. In this way, in the first sub-assembly, one end of the elastic member 7B abuts against the lower member 64B, the other end of the elastic member 7B directly abuts against the gasket 53B and indirectly abuts against the valve needle 51B, and the lower member 64B is in guiding fit with the lower clamping member 52B. In this step, the assembly order among the parts is not limited, as long as the first sub-assembly can be assembled. The upper member 63B is arranged at the periphery portion of the transmission shaft 41B.

Step A22, fixedly connecting the upper member 63B with the connecting body 62B to serve as the first assembly, allowing the first radial protrusion of the transmission shaft 41B to suspendingly support the first suspension portion of the movable connecting component 6B, and the second radial protrusion of the movable connecting component 6B to suspendingly support the second suspension portion of the lower clamping member 52B. That is, the transmission component 4B suspendingly supports the movable connecting component 6B, the movable connecting component 6B suspendingly supports the valve needle component 5B, one end of the elastic member 7B abuts against the lower member 64B, and the other end of the elastic member 7B abuts against the valve needle 51B.

Step A3, fixing the lower valve body 13B with the valve core sleeve 2B by furnace brazing to form a second assembly. Apparently, it is conceivable that, the above parts may be connected by other welding methods in this step. In this step, the lower valve body 13B, the valve core sleeve 2B, the first connecting tube and the second connecting tube may be simultaneously fixed by furnace brazing to form the second assembly, so as to save a manufacturing cost. That is, the valve core sleeve 2B is arranged in the lower valve body 13B and the lower end portion of the valve core sleeve 2B extends out of the lower valve body 13B, the second connecting tube is welded to a periphery of the lower end portion of the valve core sleeve 2B, and the first connecting tube is welded to the lower valve body 13B.

Step A4, assembling the first assembly with the second assembly, wherein the valve needle component 5B of the first assembly is inserted into the valve core sleeve 2B from a lower end for assembling with the valve core sleeve 2B, such that the first guide inner wall 201B of the inner wall of the valve core sleeve 2B is in sliding clearance fit with the first guide outer wall 601B of the outer wall of the connecting body 62B.

Step A5, sleeving the nut component 8B on the periphery of the transmission shaft 41B and threadedly connecting the nut component 81B with the transmission shaft 41B, fixing the nut component 81B to the lower valve body 13B by welding, and fixing the rotor 31B to the transmission shaft 41B by welding.

Step A6, fixing the upper valve body 12B to the lower valve body 13B by welding, to complete the assembling of the electric valve in the present embodiment.

It should be noted that, the transmission component 4B may adopt the split structure shown in the first embodiment, and will not be repeated herein.

It should be understood by those skilled in the art that, the movable connecting component 6B in the present embodiment may also be entirely arranged in the valve core sleeve 2B, that is, the movable connecting component 6B does not extend out of the valve core sleeve 2B. It should be understood that, the lower end portion of the valve needle component 5B may extend out of the valve core sleeve 2A as well, as long as the object of the present application can be achieved.

It should be noted that, in each of the above embodiments, the valve port of the electric valve is arranged at the valve core sleeve. Specifically, the valve core sleeve is a cylindrical structure having a core chamber, the valve core sleeve is fixedly connected to the valve body component, and a peripheral wall of the valve core sleeve is further provided with communication ports 22A/22B to allow an inner chamber of the valve core sleeve to be in communication with an outer space of the valve core sleeve, so that when the valve port is in the valve opened state, a fluid inlet and a fluid outlet of the electric valve can be in communication with each other through the valve port and the communication ports. The elastic member 7A/7B in each of the above embodiments may specifically be a compression spring.

In addition, an upper end of the valve core sleeve may be fixed to the nut component, to improve the coaxiality between the nut component and the valve core sleeve, thereby controlling the coaxiality between the transmission component and the valve core sleeve.

Apparently, in practical arrangement, the valve port may be directly arranged at the lower valve body or another component may be provided and the valve port may be arranged thereon, and a separate valve core sleeve may be arranged inside the valve body component for guiding the movable connecting component and the valve needle component. Similarly, the valve core sleeve in each of the embodiments may not be directly fixed to the valve body component, instead, the valve core sleeve may be fixed another component, and then the above component is fixedly connected to the valve body component.

On the premise that the object of the present application can be achieved, both the valve needle component and the movable connecting component may be arranged in the valve core sleeve, or the above two components may be partially arranged in the valve core sleeve respectively, or one of the above two components is arranged in the valve core sleeve and the other is not arranged in the valve core sleeve.

Furthermore, the method for manufacturing the electric valve according to the present application is exemplified hereinbefore, so that the technical solution of the present application can be understood. It should be understood that, the above steps are numbered only for clearly illustrating the assembly steps of the electric valve, and the order of the numbers does not represent the order of the steps. As long as the assembly of the electric valve can be realized, the order of the steps can be flexibly adjusted according to needs.

The electric valve and the manufacturing method therefor provided by the present application are described in detail hereinbefore. The principles and implementations of the present application are clarified from specific embodiments herein. The above description of the embodiments is only intended to assist understanding the method and the key concept of the present application. It should be noted that, for those skilled in the art, improvements and modifications may also be made to the present application without departing from the principle of the application. Those improvements and modifications should also be included in the scope of protection of claims of the application.

The invention claimed is:

1. An electric valve, comprising:
   a valve body component comprising a valve core sleeve, wherein the valve core sleeve comprises a first guide inner wall;
   a drive component comprising an electromagnetic coil and a rotor;
   a transmission component comprising a transmission shaft, wherein the transmission shaft is fixedly connected with the drive component;
   a movable connecting component suspendingly connected with the transmission component, wherein the movable connecting component is configured to be driven by the transmission component to axially move with respect to the valve core sleeve; the movable connecting component comprises a connecting body, the connecting body comprises a first guide outer wall, the first guide outer wall is in sliding clearance fit with the first guide inner wall, the connecting body comprises a lower opening portion and an accommodating hole in communication with the lower opening portion, and a hole wall of the accommodating hole comprises a second guide inner wall;
   a valve needle component suspendingly connected with the movable connecting component, wherein the valve needle component is configured to be driven by the movable connecting component to move axially with respect to the valve core sleeve; the valve needle component comprises a valve needle, the valve needle comprises a second guide outer wall, and the second guide outer wall is in sliding clearance fit with the second guide inner wall; and
   an elastic member, wherein one end of the elastic member abuts against the movable connecting component, and another end of the elastic member abuts against the valve needle,
   wherein
   the transmission component comprises a first radial protrusion, the movable connecting component comprises a first suspension portion and a second radial protrusion, and the valve needle component comprises a second suspension portion; the first radial protrusion is configured to abut against or be separated from the first suspension portion, and the second radial protrusion is configured to abut against or be separated from the second suspension portion; the connecting body comprises a stop portion arranged below the first radial protrusion, and after the transmission component moves in a valve closing direction to a position where the first radial protrusion abuts against the stop portion, the transmission component is configured to push the movable connecting component to move in the valve closing direction, and the elastic member is configured to push the valve needle toward a valve port.

2. The electric valve according to claim 1, wherein the connecting body further comprises an upper opening portion, the movable connecting component further comprises an upper member arranged on the upper opening portion, and a lower member arranged on the lower opening portion; the upper member comprises a first annular portion having a through hole, and the first annular portion serves as the first suspension portion; the lower member comprises a base member having a through hole, the base member is arranged on a periphery of the valve needle, an inner wall of the base member comprises a second annular portion, the second annular portion serves as the second radial protrusion, the transmission component further comprises an upper clamping member arranged at a lower end portion of the transmission shaft, the upper clamping member comprises a large-diameter ring portion located between the upper member and the stop portion, and the large-diameter ring portion serves as the first radial protrusion; and an inner wall of the connecting body comprises a first annular protrusion opposite to the first radial protrusion, and the first annular protrusion serves as the stop portion.

3. The electric valve according to the claim 2, wherein an inner wall of the valve core sleeve comprises a first small-diameter portion and a first diameter-expanded portion arranged above the first small-diameter portion, and the first guide inner wall is arranged on the first small-diameter portion; and the upper opening portion of the connecting body is fixed to the upper member by welding, and/or an outer wall of the connecting body comprises a first large-diameter portion and a first diameter-reduced portion arranged above the first large-diameter portion, the first guide outer wall is arranged on the first large-diameter portion, and the first diameter-reduced portion is fixed to the upper member by welding.

4. The electric valve according to the claim 2, wherein an inner wall of the valve core sleeve comprises a first small-diameter portion and a second diameter-expanded portion arranged below the first small-diameter portion, and the first guide inner wall is arranged on the first small-diameter portion; and the lower opening portion of the connecting body is fixed to the lower member by welding, and/or an outer wall of the connecting body comprises a first large-diameter portion and a second diameter-reduced portion arranged below the first large-diameter portion, the first guide outer wall is arranged on the first large-diameter portion, and the second diameter-reduced portion is fixed to the lower member by welding.

5. The electric valve according to the claim 1, wherein the valve needle component further comprises a lower clamping member, the valve needle comprises a main body portion, a flow regulating portion located below the main body portion, and a guiding portion located above the main body portion, the guiding portion is arranged in the accommodating hole, and the second guide outer wall is arranged on an outer wall of the guiding portion; the lower clamping member is arranged on a periphery of the main body portion; a lower end surface portion of the lower clamping member serves as the second suspension portion; and one end of the elastic member abuts against the movable connecting component, and another end of the elastic member abuts against the main body portion.

6. A method for manufacturing an electric valve, wherein the electric valve comprises:
a valve body component comprising a valve core sleeve, wherein the valve core sleeve comprises a first guide inner wall;
a drive component comprising an electromagnetic coil and a rotor;
a transmission component comprising a transmission shaft, wherein the transmission shaft is fixedly connected with the drive component;
a movable connecting component suspendingly connected with the transmission component, wherein the movable connecting component is configured to be driven by the transmission component to axially move with respect to the valve core sleeve; the movable connecting component comprises a connecting body, the connecting body comprises a first guide outer wall, the first guide outer wall is in sliding clearance fit with the first guide inner wall, the connecting body comprises a lower opening portion and an accommodating hole in communication with the lower opening portion, and a hole wall of the accommodating hole comprises a second guide inner wall;
a valve needle component suspendingly connected with the movable connecting component, wherein the valve needle component is configured to be driven by the movable connecting component to move axially with respect to the valve core sleeve; the valve needle component comprises a valve needle, the valve needle comprises a second guide outer wall, and the second guide outer wall is in sliding clearance fit with the second guide inner wall; and
an elastic member, wherein one end of the elastic member abuts against the movable connecting component, and another end of the elastic member abuts against the valve needle
and the method comprises:
A1, preparing an upper valve body, a lower valve body, and a valve core sleeve of a valve body component, preparing a rotor, preparing a connecting body, an upper member and a lower member of a movable connecting component, preparing a valve needle and a lower clamping member of a valve needle component, preparing a transmission component and preparing a nut component;
A2, arranging an elastic member, the lower member and the lower clamping member at a periphery portion of the valve needle, allowing one end of the elastic member to abut against the lower member and another end to abut against the valve needle; arranging the upper member at a periphery portion of a transmission shaft; sleeving the connecting body on a periphery portion of the valve needle, allowing the connecting body to be in sliding clearance fit with the valve needle through a second guide inner wall and a second guide outer wall, and fixedly connecting the upper member and the lower member with an upper opening portion and a lower opening portion of the connecting body respectively;
A3, fixedly connecting the lower valve body with the valve core sleeve;

A4, allowing the valve core sleeve to be in sliding clearance fit with the connecting body through a first guide inner wall and a first guide outer wall;

A5, threadedly connecting the nut component with the transmission shaft, fixedly connecting the nut component with the lower valve body, and fixedly connecting the rotor with the transmission shaft; and A6, fixing the upper valve body of the valve body component to the lower valve body by welding.

7. The method according to the claim 6 for manufacturing the electric valve, wherein
step A2 is performed after step A3.

8. An electric valve, comprising:
a valve body component comprising a valve core sleeve, wherein the valve core sleeve comprises a first guide inner wall;
a drive component comprising an electromagnetic coil and a rotor;
a transmission component comprising a transmission shaft, wherein the transmission shaft is fixedly connected with the drive component;
a movable connecting component suspendingly connected with the transmission component, wherein the movable connecting component is configured to be driven by the transmission component to axially move with respect to the valve core sleeve; the movable connecting component comprises a connecting body and a lower member fixedly connected with the connecting body, the connecting body comprises a first guide outer wall, the first guide outer wall is in sliding clearance fit with the first guide inner wall, and the lower member includes a second guide outer wall;
a valve needle component suspendingly connected with the movable connecting component, wherein the valve needle component is configured to be driven by the movable connecting component to move axially with respect to the valve core sleeve; the valve needle component comprises a valve needle and a lower clamping member, the valve needle is fixedly connected with the lower clamping member, the lower clamping member comprises a second guide inner wall, and the second guide inner wall is in sliding clearance fit with the second guide outer wall; and
an elastic member, wherein one end of the elastic member abuts against the connecting body, and another end of the elastic member abuts against the valve needle.

9. The electric valve according to the claim 8, wherein
the transmission component comprises a first radial protrusion, the connecting body comprises a first suspension portion, the lower member comprises a second radial protrusion, and the lower clamping member comprises a second suspension portion; the first radial protrusion is configured to abut against or be separated from the first suspension portion, and the second radial protrusion is configured to abut against or be separated from the second suspension portion; and the connecting body comprises a stop portion arranged below the first radial protrusion, and after the transmission component moves in a valve closing direction to a position where the first radial protrusion abuts against the stop portion, the transmission component is configured to push the movable connecting component to move in the valve closing direction, and the elastic member is configured to push the valve needle toward a valve port.

10. The electric valve according to the claim 9, wherein
the first radial protrusion is arranged at a lower end portion of the transmission shaft, the connecting body comprises an upper opening portion, a bottom of the upper opening portion serves as the stop portion, the connecting body further comprises a lower inserting hole, the lower member comprises an extending portion extending into the lower inserting hole, a second radial protrusion extending in a radial direction of the lower end portion of the lower member, and a base portion connecting with the extending portion and the second radial protrusion, and the second guide outer wall is arranged on an outer wall of the base portion; and the movable connecting component further comprises an upper member arranged on the upper opening portion, the upper member comprises a first annular portion having a through hole, and the first annular portion serves as the first suspension portion.

11. The electric valve according to the claim 10, wherein
an inner wall of the valve core sleeve comprises a first small-diameter portion and a first diameter-expanded portion arranged above the first small-diameter portion, and the first guide inner wall is arranged on the first small-diameter portion; and the upper opening portion of the connecting body is fixed to the upper member by welding, and/or an outer wall of the connecting body comprises a first large-diameter portion and a first diameter-reduced portion arranged above the first large-diameter portion, the first guide outer wall is arranged on the first large-diameter portion, and the first diameter-reduced portion is fixed to the upper member by welding.

12. The electric valve according to the claim 9, wherein
the valve needle comprises a main body portion and a flow regulating portion located below the main body portion, the lower clamping member is a structure which is substantially through in the axial direction, the lower clamping member is sleeved on a periphery portion of the lower member, the elastic member is arranged on a periphery portion of the lower clamping member, one end of the elastic member abuts against the connecting body, and another end of the elastic member abuts against the main body portion.

13. A method for manufacturing the electric valve according to claim 8, comprising:
A1, preparing an upper valve body, a lower valve body, and a valve core sleeve of a valve body component, preparing the rotor, preparing a connecting body, an upper member and a lower member of a movable connecting component, preparing a valve needle and a lower clamping member of a valve needle component, preparing a transmission component and preparing a nut component;

A2, sleeving the lower clamping member at a periphery of the lower member, allowing the lower clamping member to be in sliding clearance fit with the lower member through a second guide inner wall and a second guide outer wall, fixedly connecting the lower clamping member with the valve needle, arranging the elastic member at a periphery of the lower clamping member, extending an upper end of the lower member into a lower inserting hole of the connecting body and fixedly connecting the lower member with the connecting body, arranging the upper member at a periphery of the transmission shaft, and fixedly connecting the upper member with an upper opening portion of the connecting body;

A3, fixedly connecting the lower valve body with the valve core sleeve;

A4, allowing the valve core sleeve to be in sliding clearance fit with the connecting body through a first guide inner wall and a first guide outer wall;

A5, threadedly connecting the nut component with the transmission shaft, fixedly connecting the nut component with the lower valve body, and fixedly connecting the rotor with the transmission shaft; and A6, fixing the upper valve body of the valve body component to the lower valve body by welding.

14. The method according to the claim 13 for manufacturing the electric valve, wherein
step A2 is performed after step A3.

* * * * *